US012798623B2

(12) United States Patent
Huang et al.

(10) Patent No.: US 12,798,623 B2
(45) Date of Patent: Nov. 17, 2026

(54) AUTONOMOUS DRIVING METHOD

(71) Applicant: BEIJING BAIDU NETCOM SCIENCE TECHNOLOGY CO., LTD., Beijing (CN)

(72) Inventors: Jizhou Huang, Beijing (CN); Fan Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 244 days.

(21) Appl. No.: 18/606,329

(22) Filed: Mar. 15, 2024

(65) Prior Publication Data

US 2024/0246575 A1 Jul. 25, 2024

(30) Foreign Application Priority Data

Mar. 17, 2023 (CN) ......................... 202310266204.9

(51) Int. Cl.
*B60W 60/00* (2020.01)
*B60W 50/00* (2006.01)
*G06N 3/08* (2023.01)

(52) U.S. Cl.
CPC .... *B60W 60/0027* (2020.02); *B60W 50/0097* (2013.01); *G06N 3/08* (2013.01); *B60W 2556/10* (2020.02)

(58) Field of Classification Search
CPC ......... B60W 60/0027; B60W 50/0097; B60W 2556/10; B60W 60/001; B60W 50/00; B60W 2050/0002; B60W 2050/0019; B60W 2050/0031; B60W 2420/54;
(Continued)

(56) References Cited

U.S. PATENT DOCUMENTS

2022/0048498 A1 2/2022 Khandelwal et al.
2024/0211647 A1* 6/2024 Ashish .................... G06F 30/20

FOREIGN PATENT DOCUMENTS

CN 108773373 A 11/2018
CN 112861811 A * 5/2021 ........... G06F 18/214
CN 113076599 A 7/2021
(Continued)

OTHER PUBLICATIONS

Caruana, "MultiTask Learning", School of Computer Science, Carnegie Mellon University, 1997 (Year: 1997).*
(Continued)

*Primary Examiner* — Hitesh Patel
*Assistant Examiner* — Shien Ming Chou
(74) *Attorney, Agent, or Firm* — FisherBroyles, LLP

(57) ABSTRACT

An autonomous driving method implemented by using an automatic driving model is provided. The autonomous driving model comprises a multimodal encoding layer and a decision control layer. The autonomous driving method includes: obtaining first input information of the multimodal encoding layer; inputting the first input information into the multimodal encoding layer to obtain an implicit representation corresponding to the first input information output by the multimodal encoding layer; and inputting second input information including the implicit representation into the decision control layer to obtain target autonomous driving strategy information output by the decision control layer.

19 Claims, 10 Drawing Sheets

200

(58) Field of Classification Search
CPC .......... G06N 3/08; G06N 3/045; G06V 10/82; G06V 20/58
USPC ........................................................... 701/27
See application file for complete search history.

(56) References Cited

FOREIGN PATENT DOCUMENTS

| | | | | | |
|---|---|---|---|---|---|
| CN | 113168763 | A | * | 7/2021 | ........ B60W 60/0053 |
| CN | 113743469 | A | | 12/2021 | |
| CN | 113954864 | A | | 1/2022 | |
| CN | 114358128 | A | | 4/2022 | |
| CN | 115303297 | A | | 11/2022 | |
| CN | 115578705 | A | | 1/2023 | |
| CN | 115578876 | A | | 1/2023 | |
| CN | 117452969 | A | * | 1/2024 | ............. G01C 21/20 |
| CN | 120792954 | A | * | 10/2025 | |
| WO | 2021226921 | A1 | | 11/2021 | |

OTHER PUBLICATIONS

Jin, "Adapt Action-aware Driving Caption Transformer", ArXiv, Feb. 2023 (Year: 2023).*
Watelectronics "Backpropagation Neural Network _ Types, Advantages & Disadvantages", https://www.watelectronics.com/backpropagation-neural-network/ , 2021 (Year: 2021).*
Second Office Action of the counterpart CN application No. 202310266204.9, official mailing date: Apr. 30, 2024, 12 pages.
Notice of Allowance of the counterpart CN application No. 202310266204.9, official mailing date: Aug. 19, 2024, 4 pages.
Search Report from related CN Appl. No. 202310266204.9, issued Feb. 3, 2024, 1 page.

* cited by examiner

700

800

AUTONOMOUS DRIVING METHOD

CROSS REFERENCE TO RELATED APPLICATION

This application claims priority to Chinese patent application No. 202310266204.9 filed on Mar. 17, 2023, the contents of which are hereby incorporated by reference in their entirety for all purposes.

TECHNICAL FIELD

The present disclosure relates to the technical field of computers, and in particular to the technical field of autonomous driving and artificial intelligence, and specifically relates to an autonomous driving method implemented by using the autonomous driving model, an electronic device, and a computer readable storage medium.

BACKGROUND

Artificial intelligence is the discipline of studying how computers can simulate certain thinking processes and intelligent behaviors of a human being (such as learning, reasoning, thinking, planning, etc.), and there are both hardware-level and software-level technologies. The artificial intelligence hardware technologies generally include technologies such as sensors, special artificial intelligence chips, cloud computing, distributed storage, big data processing, etc. The artificial intelligence software technologies mainly include computer vision technology, speech recognition technology, natural language processing technology, machine learning/deep learning, big data processing technology, knowledge graph technology and other major technological directions.

The autonomous driving technology incorporates technologies such as recognition, decision making, positioning, communication security, and human-computer interaction, etc. The autonomous driving strategy can be assisted in generating through artificial intelligence learning.

The high-precision map is also referred to as a high-precision map, which is a map used by an autonomous vehicle. The high-precision map has accurate vehicle position information and rich road element data information, which can help the automobile to predict complex information about the road surface such as slope, curvature, heading and the like, thereby better avoiding potential risks. In other words, the autonomous driving technology strongly depends on a high-precision map.

The methods described in this section are not necessarily methods that have been previously conceived or employed. Unless otherwise indicated, it should not be assumed that any method described in this section is considered to be the prior art only due to its inclusion in this section. Similarly, the problems mentioned in this section should not be assumed to be recognized in any prior art unless otherwise indicated.

SUMMARY

The present disclosure provides an autonomous driving method implemented by using the autonomous driving model, an electronic device, and a computer readable storage medium.

According to an aspect of the present disclosure, an autonomous driving method implemented by using an automatic driving mode is provided. The autonomous driving model comprises a multimodal encoding layer and a decision control layer. The multimodal encoding layer and the decision control layer are connected to form an end-to-end neural network model such that the decision control layer obtains autonomous driving strategy information based directly on the output of the multimodal encoding layer. The autonomous driving method includes: obtaining first input information of the multimodal encoding layer, wherein the first input information comprises navigation information of a target vehicle and perception information for surrounding environment of the target vehicle obtained by using one or more sensors, and the perception information comprises current perception information and historical perception information for the surrounding environment of the target vehicle during vehicle driving process; inputting the first input information into the multimodal encoding layer to obtain an implicit representation corresponding to the first input information output by the multimodal encoding layer; and inputting second input information including the implicit representation into the decision control layer to obtain target autonomous driving strategy information output by the decision control layer.

According to another aspect of the present disclosure, an electronic device is provided. The electronic device includes: one or more processors; and a memory storing one or more programs configured to be executed by the one or more processors, the one or more programs comprising instructions for performing operations comprising: obtaining first input information of a multimodal encoding layer of an automatic driving model, wherein the first input information comprises navigation information of a target vehicle and perception information for surrounding environment of the target vehicle obtained by using one or more sensors, and the perception information comprises current perception information and historical perception information for the surrounding environment of the target vehicle during vehicle driving process; inputting the first input information into the multimodal encoding layer to obtain an implicit representation corresponding to the first input information output by the multimodal encoding layer; and inputting second input information including the implicit representation into a decision control layer of the automatic driving model to obtain target autonomous driving strategy information output by the decision control layer, wherein the multimodal encoding layer and the decision control layer are connected to form an end-to-end neural network model such that the decision control layer obtains autonomous driving strategy information based directly on the output of the multimodal encoding layer.

According to another aspect of the present disclosure, A non-transitory computer-readable storage medium is provided. The non-transitory computer-readable storage medium stores one or more programs comprising instructions that, when executed by one or more processors of a computing device, cause the computing device to perform operations comprising: obtaining first input information of a multimodal encoding layer of an automatic driving model, wherein the first input information comprises navigation information of a target vehicle and perception information for surrounding environment of the target vehicle obtained by using one or more sensors, and the perception information comprises current perception information and historical perception information for the surrounding environment of the target vehicle during vehicle driving process; inputting the first input information into the multimodal encoding layer to obtain an implicit representation corresponding to the first input information output by the multimodal encoding layer; and inputting second input information including the implicit representation into a decision control layer of the automatic driving model to obtain target autonomous driving strategy information output by the decision control layer, wherein the multimodal encoding layer and the decision control layer are connected to form an end-to-end neural network model such that the decision control layer obtains autonomous driving strategy information based directly on the output of the multimodal encoding layer.

It should be understood that the content described in this section is not intended to identify key or important features of the embodiments of the present disclosure, nor is it intended to limit the scope of the present disclosure. Other features of the present disclosure will become readily understood from the following description.

BRIEF DESCRIPTION OF THE DRAWINGS

The drawings exemplarily illustrate embodiments and constitute a part of the specification, and are used in conjunction with the textual description of the specification to explain the exemplary implementations of the embodiments. The illustrated embodiments are for illustrative purposes only and do not limit the scope of the claims. Throughout the drawings, like reference numerals refer to similar but not necessarily identical elements.

DETAILED DESCRIPTION OF THE EMBODIMENTS

Figure 1:
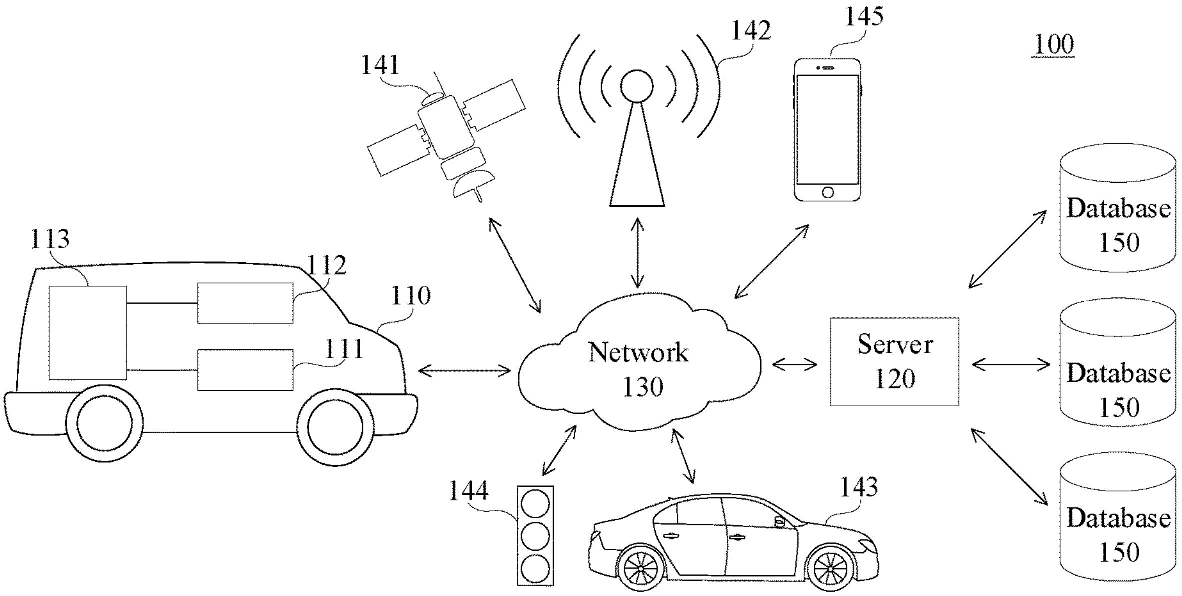
FIG. 1 illustrates a schematic diagram of an example system in which various methods described herein may be implemented, in accordance with some embodiments of the present disclosure.

The embodiments of the present disclosure are described below in conjunction with the accompanying drawings, including various details of the embodiments of the present disclosure to facilitate understanding, and they should be considered as example only. Therefore, one of ordinary skill in the art will recognize that various changes and modifications may be made to the embodiments described herein without departing from the scope of the present disclosure. Similarly, descriptions of well-known functions and structures are omitted in the following description for the purpose of clarity and conciseness.

In the present disclosure, unless otherwise specified, the terms "first", "second" and the like are used to describe various elements and are not intended to limit the positional relationship, timing relationship, or importance relationship of these elements, and such terms are only used to distinguish one element from another element. In some examples, the first element and the second element may refer to the same instance of the element, while in some cases they may also refer to different instances based on the description of the context.

The terminology used in the description of the various examples in this disclosure is for the purpose of describing particular examples only and is not intended to be limiting. Unless the context clearly indicates otherwise, if the number of elements is not specifically defined, the element may be one or more. In addition, the terms "and/or" used in the present disclosure encompass any one of the listed items and all possible combinations thereof.

The acquisition, storage and application of the user's personal information involved in the technical solutions of the present disclosure are in compliance with relevant laws and regulations and do not violate public order and morals.

In the related art, algorithms mainly based on optimization and rules in the autonomous driving technology generally rely on high-precision maps and algorithm optimization for different scenarios. A high-precision map, also referred to as a high-accuracy map, mainly includes two types of information: one type of information is road related information, including the location, category, width, slope and curvature of lanes of an expressway or the like; the other type of information is the information related to ancillary facilities and structures associated with lanes, including information on road details and infrastructure, such as traffic signs, traffic lights, overpass, traffic monitoring points (electronic eyes, speed radar), roadside facilities, obstacles etc., and including lane restriction scenarios (e.g., traffic restriction at a certain time on a lane) and lane restriction information (e.g., vehicle type, weather conditions, lane access time), and the like. With these data, the navigation system of an autonomous driving vehicle can accomplish accurate positioning, determine which roads can be traveled, and provide guidance for the vehicle.

The high-precision map data has both static elements (e.g., road traffic infrastructure, lane network and road network, etc.) and dynamic elements (e.g., road congestion conditions, traffic accidents, etc.). In the static data layer, the high-precision map may include information such as lane topology (e.g., lane baseline, lane connection points, lane traffic type, lane function type, etc.), road components (pavement markings, road facilities), the number of lanes, the type of lanes, slope, curvature, and the position of traffic signals, etc.; in a dynamic data layer, the high-precision map may include information such as the real-time state of a traffic light at an intersection, road congestion condition, the weather condition of a vehicle traffic area, temporary traffic signs and traffic control data resulting from traffic congestion, vehicles, pedestrians, and the like.

The high-precision map has precise vehicle position information and rich road element data information, which can help an automobile to predict complex road surface information such as slope, curvature, heading etc., thereby better avoiding potential risks. Accordingly, the application of algorithms relying on high-precision maps is limited to a very localized area, which may result in failure of autonomous driving due to map errors, and it is difficult to address a large number of long-tail situations. In addition, the algorithm in the related art depends on a large amount of manual labeling, which are labor-intensive on the one hand, and on the other hand, the labeling methods are perception oriented. For example, there is a large amount of background information during the driving process, as well as distant obstacles irrelevant to the driving (e.g., a non-motorized vehicle on the edge of the opposite lane). In the automatic annotation of perception-oriented methods, it is difficult for an annotator to determine which obstacle should be identified and which should not be concerned, and it is difficult to directly serve the strategy optimization and driving decisions for autonomous driving.

In the related art, unmanned driving technology mainly depends on the synergy of a perception module and a planning and control module. The operation process of autonomous driving includes two stages: first, converting unstructured information obtained by sensors such as a camera or a radar and the like into structured information (the structured information includes obstacle information, other vehicle information, pedestrian and non-motor vehicle information, lane line information, traffic light information, other static road information, etc.). These information may be matched with the high-precision map to accurately obtain the location information on the high-precision map. Second, prediction and decision-making are performed based on the structured information and the relevant observation history. The prediction includes predicting the changes of the surrounding structured environment within a future period of time; the decision-making includes generating some structured information (e.g., changing lanes, cutting in and waiting) that may be used for subsequent trajectory planning. Third, based on the structured decision-making information and the changes of the surrounding structured environment, a trajectory of the target vehicle for a future period is planned, for example trajectory or control information (e.g., planning speed and position) is planned.

Through research, it has been found that perception-prediction-planning based autonomous driving technologies may face some technical problems. The first is the problem of error accumulation, because the perception cannot be responsible directly for the decision making, which makes the perception not necessarily able to capture information that plays a critical role on the decision making, in addition, because errors in perception are difficult to be made up in subsequent processes (e.g., obstacles within the area may not be identified), subsequent processes may have difficulty in making a correct decision in the absence of critical obstacles.

Secondly, it is impossible to solve the coupling problem between prediction and planning, and the behavior of surrounding obstacles, especially critical obstacles interacting with the target vehicle, may be affected by the target vehicle. In other words, there is a coupling between the prediction module and the planning modules in the operation process of the autonomous driving model, which makes the streaming decisions have an impact on the final autonomous driving effect.

In addition, there is a problem in the defective representation of the structured information, and the structured information is completely limited to manually predefined criteria, and once a new paradigm (e.g., there is an unknown obstacle, an unknown state of the vehicle or pedestrian, and so on, etc.) that is not explicitly defined is encountered, the algorithm may easily fail.

Finally, there is the problem of relying on high-cost maps (e.g., high-precision maps), as the relevant technologies mainly rely on information such as high-precision map point clouds etc. to perform vehicle positioning, however, in practice, high-precision maps may only be available in a limited area, which restricts the actual application area of autonomous driving; in addition, the updating cost of high-precision maps is huge, and once the maps do not match the actual roads, decision failure is easily caused.

Based on this, the present disclosure provides an autonomous driving model, an autonomous driving method implemented by using the autonomous driving model, a training method for the autonomous driving model, an autonomous driving device based on the autonomous driving model, a training device for the autonomous driving model, an electronic device, a computer-readable storage medium, a computer program product, and an autonomous driving vehicle.

A perception-decision integrated autonomous driving technology is adopted such that the perception is directly responsible for the decision-making, which facilitates the perception to capture information that plays a key role in decision making, reduces error accumulation, and solves the coupling problem between prediction and decision in the related art. In addition, since the perception is directly responsible for the decision-making, the problem that the algorithm is prone to failure due to the fact that the structured information is limited by the manually predefined standard can be overcome, the autonomous driving technology that emphasizes perception over maps is achieved, and then the problem of decision-making failure caused by untimely updating and restricted areas of high-precision maps can be overcome, and the updating cost of high-precision maps can be saved because of the fact that the dependence on high-precision maps is eliminated.

Embodiments of the present disclosure will be described in detail below with reference to the accompanying drawings.

FIG. 1 illustrates a schematic diagram of an example system 100 in which various methods and devices described herein may be implemented in accordance with embodiments of the present disclosure. Referring to FIG. 1, the system 100 includes a motor vehicle 110, a server 120, and one or more communication networks 130 that couple the motor vehicle 110 to the server 120.

In some embodiments of the present disclosure, the motor vehicle 110 may include a computing device according to some embodiments of the present disclosure and/or be configured to perform a method according to some embodiments of the present disclosure.

The server 120 may run one or more services or software applications that enable autonomous driving. In some embodiments, server 120 may also provide other services or software applications, which may include non-virtual environments and virtual environments. In the configuration shown in FIG. 1, the server 120 may include one or more components that implement functions performed by the server 120. These components may include software components, hardware components, or a combination thereof that are executable by one or more processors. A user of the motor vehicle 110 may sequentially utilize one or more client applications to interact with the server 120 to utilize the services provided by these components. It should be understood that a variety of different system configurations are possible, which may be different from the system 100. Therefore, FIG. 1 is an example of a system for implementing the various methods described herein and is not intended to be limiting.

The server 120 may include one or more general purpose computers, a dedicated server computer (e.g., a PC (personal computer) server, a UNIX server, a mid-end server), a blade server, a large computer, a server cluster, or any other suitable arrangement and/or combination. The server 120 may include one or more virtual machines running a virtual operating system, or other computing architectures involving virtualization (e.g., one or more flexible pools of a logical storage device that may be virtualized to maintain virtual storage devices of a server). In various embodiments, the server 120 may run one or more services or software applications that provide the functions described below.

The computing unit in the server 120 may run one or more operating systems including any of the operating systems described above and any commercially available server operating system. The server 120 may also run any of a variety of additional server applications and/or intermediate layer applications, including a HTTP server, an FTP server, a CGI server, a Java server, a database server, etc.

In some implementations, the server 120 may include one or more applications to analyze and merge data feeds and/or event updates received from the motor vehicle 110. The server 120 may also include one or more applications to display the data feeds and/or the real-time events via one or more display devices of the motor vehicle 110.

The network 130 may be any type of network well known to those skilled in the art, which may support data communication using any of a variety of available protocols (including but not limited to TCP/IP, SNA, IPX, etc.). By way of example only, one or more networks 130 may be a satellite communication network, a local area network (LAN), an Ethernet-based network, a token ring, a wide area network (WAN), an Internet, a virtual network, a virtual private network (VPN), an intranet, an external network, a blockchain network, a public switched telephone network (PSTN), an infrared network, a wireless network (including, for example, Bluetooth, WiFi), and/or any combination of these with other networks.

The system 100 may also include one or more databases 150. In certain embodiments, these databases may be used to store data and other information. For example, one or more of the databases 150 may be used to store information such as audio files and video files. The data repositories 150 may reside in various locations. For example, the data repository used by the server 120 may be local to the server 120, or may be remote from the server 120 and may communicate with the server 120 via a network-based or dedicated connection. The data repository 150 may be of a different type. In some embodiments, the data repository used by the server 120 may be a database, such as a relational database. One or more of these databases may store, update, and retrieve data to and from the database in response to a command.

In some embodiments, one or more of the databases 150 may also be used by an application to store application data. A database used by an application may be a different type of database, such as a key-value repository, an object repository, or a conventional repository supported by a file system.

The motor vehicle 110 may include a sensor 111 for perceiving the surrounding environment. The sensors 111 may include one or more of the following sensors: a vision camera, an infrared camera, an ultrasonic sensor, a millimeter wave radar, and a laser radar (LiDAR). Different sensors can provide different detection accuracy and range. A camera may be mounted in the front, rear, or other positions of the vehicle. A vision camera can capture the situation inside and outside the vehicle in real time and present it to the driver and/or passenger. In addition, by analyzing the images captured by the vision camera, information such as traffic light indications, intersection conditions, and the operating states of other vehicles can be obtained. An infrared camera can capture objects in night vision. An ultrasonic sensor can be mounted around the vehicle and is used to measure the distance of objects outside the vehicle from the vehicle by utilizing characteristics such as strong directionality of ultrasonic waves. A millimeter wave radar can be installed in front, rear, or other positions of the vehicle, and is used to measure the distance of objects outside the vehicle from the vehicle by utilizing the characteristics of electromagnetic waves. A laser radar can be mounted in front, rear, or other locations of the vehicle for detecting edge and shape information of an object to perform object recognition and tracking. Due to the Doppler effect, the radar device can also measure the speed change of the vehicle and the moving object.

The motor vehicle 110 may also include a communication device 112, the communication device 112 may include a satellite positioning module capable of receiving satellite positioning signals (e.g., BeiDou, GPS, GLONASS, and GALILEO) from the satellites 141 and generating coordinates based on those signals. The communication device 112 may also include a module that communicates with a mobile communication base station 142, and the mobile communication network may implement any suitable communication technology, such as GSM/GPRS, CDMA, LTE, and other current or evolving wireless communication technologies (e.g., 5G technology). The communication device 112 may also have an Internet of Vehicles (IoV) or Vehicle-to-Everything (V2X) module configured to implement communications between the vehicle and the outside world, for example, Vehicle-to-Vehicle (V2V) communication with other vehicles 143 and Vehicle-to-infrastructure (V2I) communication with an infrastructure 144. Additionally, the communication device 112 may have a module configured to communicate with a user terminal 145 (including, but not limited to, a smartphone, a tablet, or a wearable device such as a watch etc.) via, for example, a wireless local area network (WLAN) using the IEEE802.11 standard or Bluetooth. With the communication device 112, the motor vehicle 110 may also access the server 120 via the network 130.

The motor vehicle 110 may further include a control device 113. The control device 113 may include a processor in communication with various types of computer-readable storage devices or media, such as a central processing unit (CPU) or a graphics processing unit (GPU), or other dedicated processors, etc. The control device 113 may include an autonomous driving system for automatically controlling various actuators in the vehicle. The autonomous driving system is configured to control the powertrain, steering system, and braking system, etc. of the motor vehicle 110 (not shown) via the plurality of actuators in response to input from the plurality of sensors 111 or other input devices to control acceleration, steering, and braking, respectively, without human intervention or with limited human intervention. Some of the processing functions of the control device 113 may be implemented through cloud computing. For example, some processes may be performed using an in-vehicle processor while other processes may be performed with computing resources of the cloud. The control device 113 may be configured to perform the method according to the present disclosure. In addition, the control device 113 may be implemented as one example of a computing device of a motor vehicle side (client) according to the present disclosure.

The system 100 of FIG. 1 may be configured and operated in various ways to enable application of various methods and devices according to the present disclosure.

Figure 2:
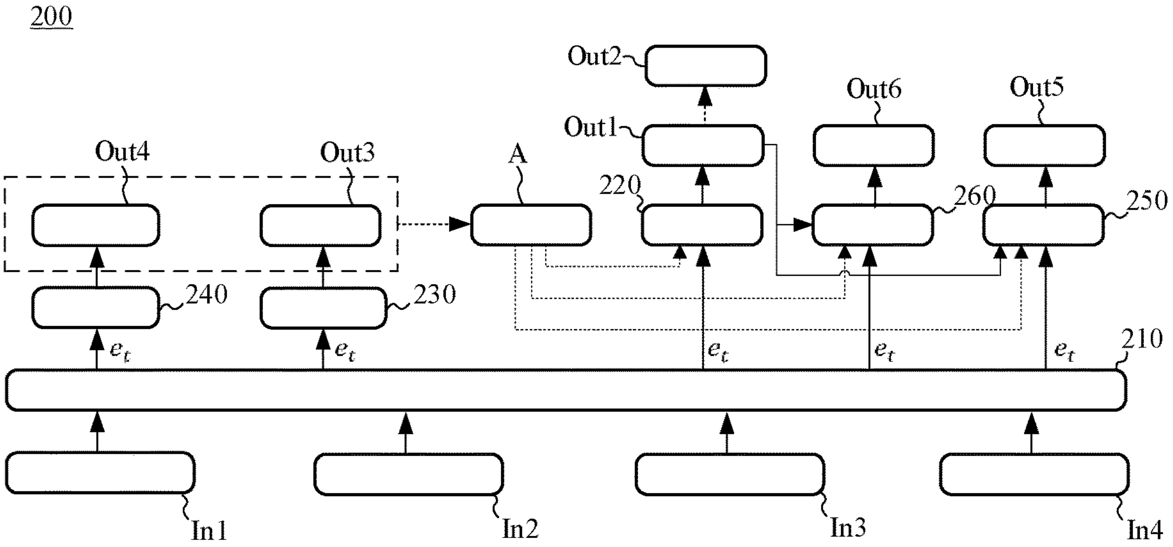
FIG. 2 illustrates a schematic diagram of an autonomous driving model, in accordance with some embodiments of the present disclosure.

According to an aspect of the present disclosure, an autonomous driving model is provided. FIG. 2 illustrates a schematic diagram of an autonomous driving model 200 according to embodiments of the present disclosure.

As shown in FIG. 2, the autonomous driving model 200 includes a multimodal encoding layer 210 and a decision control layer 220, and the multimodal encoding layer 210 and the decision control layer 220 are connected to form an end-to-end neural network model such that the decision control layer 220 obtains autonomous driving strategy information based directly on the output of the multimodal encoding layer 210. The first input information of the multimodal encoding layer 210 includes navigation information In1 of the target vehicle and perception information (for example, it may include, but is not limited to, In2, In3, and In4, and the following content is described with the perception information including In2, In3, and In4 as examples) for the surrounding environment of the target vehicle obtained using sensors, and the perception information includes current perception information and historical perception information for the surrounding environment of the target vehicle in the vehicle driving process. The multimodal encoding layer 210 is configured to obtain an implicit representation $e_t$ corresponding to the first input information In1 to In4. The second input information of the decision control layer 220 includes the implicit representation $e_t$, and the decision control layer 220 is configured to obtain the target autonomous driving strategy information based on the second input information.

As described above, in the related art, prediction can be performed based on the perception information first to obtain future prediction information, and then the decision control layer performs planning based on the future prediction information, that is, the decision control layer 220 does not perform planning based directly on the perception information, but performs planning based directly on the future prediction information. In contrast, the decision control layer 220 in the embodiment of the present disclosure can obtain autonomous driving strategy information based directly on the output of the multimodal encoding layer 210, and the multi-modal encoding layer 210 is configured to encode and calculate the perception information, which is equivalent to that the decision control layer 220 can carry out the planning and obtain the autonomous driving strategy information based directly on the perception information. In other words, perception is directly responsible for decision-making in the embodiments of the present disclosure.

In some embodiments, the autonomous driving model 200 may employ a Transformer network architecture with an encoder and a decoder. It will be appreciated that the autonomous driving model 200 may also be another neural network model based on a Transformer network architecture, which is not limited herein. The Transformer architecture may compute an implicit representation of model input and output through a self-attention mechanism. In other words, the Transformer architecture may be an Encoder-Decoder model constructed based on this self-attention mechanism.

In some embodiments, the navigation information In1 of the target vehicle in the first input information may include vectorized navigation information and vectorized map information, the vectorized navigation information and the vectorized map information may be obtained by performing a vectorization operation on one or more of lane-level or road-level navigation information, and coarse positioning information.

According to some embodiments of the present disclosure, the perception information In2, In3 and In4 may include perception information In2 of one or more cameras, perception information In3 of one or more laser radars, and perception information In4 of one or more millimeter-wave radars. It can be understood that the perception information for the surrounding environment of the target vehicle is not limited to the above form, for example, it may include only the perception information In2 of the plurality of cameras, but not the perception information In3 of one or more laser radars and the perception information In4 of one or more millimeter wave radars. The perception information In2 obtained by the camera may be perception information in the form of a picture or a video, and the perception information In3 obtained by the laser radar may be perception information in the form of a radar point cloud (for example, a three-dimensional point cloud).

In some embodiments, the above-described different forms of information (pictures, videos, point clouds), etc., may be directly input to the multimodal encoding layer 210 without preprocessing. In addition, the perception information includes current perception information $x_t$ for the surrounding environment of the target vehicle and historical perception information $x_{t-\Delta t}$ corresponding to a plurality of historical moments in the driving process of the vehicle, here, the time span between t and Δt may have a preset duration.

In some embodiments, the multimodal encoding layer 210 may perform encoding and computation on the first input information to generate the corresponding implicit representation $e_t$. The implicit representation $e_t$ may be, for example, an implicit representation in a bird's eye view (BEV) space. For example, the perception information IN2 of the camera may first be input into a shared backbone network, and the data features of each camera may be extracted. Then, the perception information In2 of the plurality of cameras is fused and converted to the BEV space. Next, cross-modal fusion can be performed in the BEV space to fuse the pixel-level visual data and the laser radar point cloud. Finally, timing fusion is performed to form an implicit representation $e_t$ of the BEV space.

In some embodiments, a Transformer Encoder structure that fuses spatial-temporal information may be used to implement the projection of the input information of the multiple cameras to the implicit representation $e_t$ of the BEV space. For example, spatial-temporal information may be utilized through BEV query mechanism (BEV queries) with grid partitioning with preset parameters. A spatial cross attention mechanism (i.e., the BEV query mechanism extracts the desired spatial features from multi-camera features by the attention mechanism) is utilized to allow the BEV query mechanism to extract features from a multi-camera perspective of its interest, and thus aggregating spatial information; in addition, a temporal self-attention mechanism (i.e., BEV features generated at each moment obtains the desired temporal information from the BEV features at a previous moment) is utilized to fuse the historical information, and thus aggregating temporal information. Accordingly, the decision control layer 220 obtains the target autonomous driving strategy information based on the input implicit representation $e_t$. The target autonomous driving strategy information may include, for example, a planned trajectory Out 1 or a control signal Out2 for the vehicle (for example, a signal for controlling an accelerator, a brake, and a steering amplitude etc.). In some embodiments, the trajectory planning Out1 may be interpreted by utilizing the control strategy module in the autonomous driving vehicle to obtain the control signal Out2 for the vehicle; or the control signal Out2 for the vehicle may be directly output based on the implicit representation $e_t$ by utilizing the neural network.

In some embodiments, the decision control layer 220 may include a decoder in a Transformer.

In FIG. 2, the solid arrows between the multimodal encoding layer 210 to the decision control layer 220, the decision control layer 220 to the trajectory planning Out 1 represent a differentiable operation, in other words, the gradient can be backpropagated through the above solid arrows when performing model training.

It can be seen that in the autonomous driving model 200 according to embodiments of the present disclosure, the multimodal encoding layer 210 and the decision control layer 220 are connected to form an end-to-end neural network model, such that the perception information can be directly responsible for decision making and the coupling problem between prediction and planning can be solved. In addition, the introduction of the implicit representation can overcome the problem that the algorithm is prone to failure due to the defective representation of the structured information. In addition, since the perception is directly responsible for the decision making, the perception can capture information that is more critical to the decision making, and error accumulation caused by perception errors is reduced. Moreover, since the perception is directly responsible for the decision making, the autonomous driving technology that emphasizes perceptions over maps can be achieved, thereby the problem of decision-making failure caused by untimely updating and restricted areas of high-precision maps can be overcome, and the cost of updating high-precision maps can be saved due to the fact that the dependence on high-precision maps is eliminated.

According to some embodiments, with continued reference to FIG. 2, the autonomous driving model 200 may further include a future prediction layer 230 which is configured to predict future prediction information Out3 for the surrounding environment of the target vehicle based on the input implicit representation $e_t$, and the second input information of the decision control layer 220 may further include at least a portion of the future prediction information Out3. For example, the future prediction information Out3 may include the position of one or more obstacles at a future moment or the input information of the one or more sensors at a future moment which are predicted based on the implicit representation $e_t$. At least a portion of the future prediction information Out3 may be input into the decision control layer 220 as auxiliary information A, and the decision control layer 220 can predict the target autonomous driving strategy information based on the implicit representation $e_t$ and the auxillary information A.

In some embodiments, the future prediction layer 230 may be a decoder in the Transformer.

In some embodiments, the future prediction information Out3 may output structured prediction information, and accordingly, the dashed arrows between the future prediction information Out3 to the auxiliary information A, and the auxiliary information A to the decision control layer 220 represent non-differentiable operations; in other words, the gradient may not be backpropagated through the above-described dashed arrows when performing model training. However, since the operations between the multimodal encoding layer 210 to the future prediction layer 230, and the future prediction layer 230 to the future prediction information Out3 are differentiable operations, the gradient can still be backpropagated in the direction indicated by the solid arrows, in other words, the future prediction layer 230 can also be trained separately.

Therefore, by introducing the future prediction layer 230 into the autonomous driving model 200, at least part of the information predicted by the future prediction layer 230 is input into the decision control layer 220 as auxiliary information to assist in decision making, which can improve the accuracy and safety of the decision making. In addition, during model training, on the basis of the decision control layer 220, the multimodal encoding layer 210 can be further trained through the future prediction layer 230, such that the encoding of the multimodal encoding layer 210 can be more accurate and the decision control layer 220 can predict more optimized target autonomous driving strategy information.

According to some embodiments, the future prediction information Out3 may include at least one of: future prediction perception information for the surrounding environment of the target vehicle (e.g., sensor information $\hat{x}_{t\rightarrow t+\Delta t}$ at a future moment in time, which includes camera input information or radar input information at a future moment in time), a future prediction implicit representation $\hat{e}_{t\rightarrow t+\Delta t}$ corresponding to the future prediction perception information (e.g., an implicit representation in BEV space corresponding to the sensor information at a future moment in time), and future prediction detection information for the surrounding environment of the target vehicle (e.g., the position $\hat{s}_{t\rightarrow t+\Delta t}$ of an obstacle at a future moment in time). Furthermore, the future prediction detection information may include the types and future prediction state information (including the size of the obstacles and various long-tail information) of a plurality of obstacles in the surrounding environment of the target vehicle.

According to some embodiments, with continued reference to FIG. 2, the autonomous driving model 200 may further include a perception detection layer 240. The perception detection layer 240 may be configured to obtain target detection information Out4 for the surrounding environment of the target vehicle based on the input implicit representation $e_t$. The target detection information Out4 includes current detection information and historical detection information, the current detection information includes the types and current state information of a plurality of road surface elements and obstacles in the surrounding environment of the target vehicle, and the historical detection information includes the types and historical state information of a plurality of obstacles in the surrounding environment of the target vehicle. The second input information of the decision control layer 220 may further include at least a portion of the target detection information Out4.

The road surface element may be a stationary object, and the obstacle may be a moving object, therefore the historical state information of the road surface element may not be detected.

In some embodiments, the target detection information Out4 may be for an bounding box in three-dimensional space of the obstacle, and may indicate the category, state, or the like of the corresponding obstacle in the bounding box. For example, the size and position of the obstacle in the bounding box, and the type of the vehicle, the current state of the vehicle (e.g., whether the turn signals and the high beam are turned on, and other long-tail information), the position and length of the lane line, and the like may be indicated. It will be understood that the categories for the corresponding obstacles in the bounding box may be one or more of a plurality of predefined categories.

Furthermore, the target detection information Out4 (the current detection information and the historical detection information) may be structured information. Accordingly, the dashed arrows between the target detection information Out4 to the auxiliary information A, and the auxillary information A to the decision control layer 220 represent non-differentiable operations, in other words, the gradient may not be backpropagated through the above-described dashed arrows when performing model training. However, since the operations between the multimodal encoding layer 210 to the perception detection layer 240, and the perception detection layer 240 to the target detection information Out4 are differentiable operations, the gradient can still be backpropagated in the direction indicated by the solid arrows, in other words, the future prediction layer 230 can also be trained separately.

In some embodiments, the prediction detection layer 240 may include a decoder in the Transformer.

Therefore, by introducing the perception detection layer 240 into the autonomous driving model 200, at least part of the information predicted by the prediction detection layer 240 is input into the decision control layer 220 as auxiliary information to assist in decision making, which can enable the detection information for the current and historical period of time for the surrounding environment of the vehicle to be used for assisting decision making, thereby improving the accuracy and safety of the decision making. In addition, during model training, on the basis of the decision control layer 220, the multimodal encoding layer 210 can be further trained through the perception detection layer 240, such that the encoding of the multimodal encoding layer 210 can be more accurate, and thereby the decision control layer 220 can predict more optimized target autonomous driving strategy information.

According to some embodiments, with continued reference to FIG. 2, the autonomous driving model 200 may further include an evaluation feedback layer 250, and the evaluation feedback layer 250 may be configured to obtain evaluative feedback information Out5 for the target autonomous driving strategy information based on the input implicitly representation $e_t$.

In some embodiments, the evaluation feedback layer 250 may be a decoder in the Transformer.

Therefore, by introducing the evaluation feedback layer 250 into the autonomous driving model 200, the user experience can be enhanced by indicating whether the current driving behavior originates from a human driver or a model, whether the current driving is comfortable, whether the current driving violates traffic rules, and whether the current driving is dangerous driving.

It will be appreciated that the solid arrows between the multimodal encoding layer 210 to the evaluation feedback layer 250 and the evaluation feedback layer 250 to the evaluation feedback information Out5 represent differentiable operations, in other words, during model training, the gradient can be backpropagated through the aforementioned solid arrows. As a result, during model training, on the basis of the decision control layer 220, the multimodal encoding layer 210 can be further trained through the evaluation feedback layer 250, such that the encoding of the multimodal encoding layer 210 can be more accurate, and thus the decision control layer 220 can predict a more optimized target autonomous driving strategy information.

According to some embodiments, as indicated by the dashed arrow in FIG. 2 pointing from the auxillary information A including the future prediction information Out3 and the target detection information Out4 to the evaluation feedback layer 250, when the autonomous driving model 200 includes the future prediction layer 230 and the perception detection layer 240, the evaluation feedback layer 250 may be configured to obtain the evaluation feedback information Out5 for the target autonomous driving strategy information based on at least a portion of one or both of the future prediction information Out3 and the target detection information Out4 as well as the implicit representation $e_t$. Thereby, the detection information and the future prediction information for the current and historical period of time for the surrounding environment of the vehicle can be used to assist in the evaluation, thereby improving the accuracy of evaluation.

According to some embodiments, the evaluation feedback layer 250 may be configured to obtain the evaluation feedback information for the target autonomous driving strategy information based on the input implicit representation $e_t$ and the target autonomous driving strategy information (e.g., the planning trajectory Out1). As a result, the evaluation feedback is assisted based on the autonomous driving strategy information, which may further improve the accuracy of evaluation.

According to other embodiments of the present disclosure, the evaluation feedback layer 250 may be configured to obtain the evaluation feedback information Out5 for the target autonomous driving strategy information based on at least a portion of one or both of the future prediction information Out3 and the target detection information Out4, the target autonomous driving strategy information, and the implicit representation $e_t$, which can further improve the accuracy of evaluation.

According to some embodiments, with continued reference to FIG. 2, the autonomous driving model 200 may further include an interpretation layer 260, the interpretation layer 260 may be configured to obtain an interpretation information Out6 for the target autonomous driving strategy information based on the input implicitly representation $e_t$, the interpretation information Out6 can characterize the decision-making category of the target autonomous driving strategy information. Therefore, the interpretation information related to the target autonomous driving strategy information can be provided to the passenger during the autonomous driving process, which enhances the interpretability of the autonomous driving strategy, thereby enhancing the user experience.

In some embodiments, the interpretation layer 260 may categorize the target autonomous driving information, each category may be mapped to a predefined natural language sentence. For example, the interpretation information OUT6 may include natural language sentences such as: "a lane change is currently required", "there is a traffic light ahead and therefore need to slow down", and"surrounding vehicles may need to merge in", etc. In addition, the interpretation layer 260 may include a decoder in the Transformer to decode to obtain a natural language sentence for the interpretation of the driving strategy.

According to some embodiments, when the autonomous driving model 200 includes the future prediction layer 230 and the perception detection layer 240, the interpretation layer 260 may be configured to obtain the interpretation information Out6 for the target autonomous driving strategy information based on at least a portion of one or both of the input future prediction information and the target detection information as well as the implicitly representing $e_t$. Thereby, the target detection information and the future prediction information for the current and historical period of time for the surrounding environment of the vehicle can be used to assist in the interpretation, thereby further enhancing the accuracy and rationality of the interpretation.

According to some embodiments, with continued reference to FIG. 2, the interpretation layer 260 may be configured to obtain the interpretation information for the target autonomous driving strategy information based on the input implicit representation $e_t$ and the target autonomous driving strategy information (e.g., the planning trajectory Out1). Therefore, the autonomous driving strategy information is used to assist in the interpretation, which may further improve the accuracy of interpretation.

According to other embodiments of the present disclosure, the interpretation layer 260 may be configured to obtain the interpretation information Out6 for the target autonomous driving strategy information based on at least a portion of one or both of the future prediction information Out3 and the target detection information Out4, the target autonomous driving strategy information, and the implicit representation $e_t$, which can further improve the accuracy of interpretation.

According to some embodiments, the sensors may include a camera, and the perception information may include a two-dimensional image captured by the camera. Moreover, the multimodal encoding layer 210 may be further configured to: obtain an implicit representation $e_t$ corresponding to the first input information based on the first input information including the two-dimensional image, and the intrinsic and extrinsic parameters of the camera.

In some embodiments, the intrinsic parameters of the camera (i.e., parameters related to the characteristics of the camera, such as the focal length of the camera, pixel size, etc.) and the extrinsic parameters (i.e., parameters in the world coordinate system, such as the position of the camera, the direction of rotation, etc.) may be input into the modal encoding layer 210 as the hyper-parameters of the autonomous driving model 200. The intrinsic and extrinsic parameters of the camera may be used to convert the input two-dimensional image to, for example, a BEV space.

In addition, the perception information may be a sequence of two-dimensional images collected by a plurality of cameras respectively.

According to some embodiments, the first input information may also include a lane-level map, and the navigation information may include road-level navigation information and/or lane-level navigation information. Unlike a high-precision map, a lane-level map has better availability and smaller spatial occupancy. Therefore, the dependence on high-precision maps can be overcome by using lane-level maps and the lane-level navigation information.

The navigation map may include a road-level map (SD MAP), a lane-level map (LD MAP), and a high-precision map (HD MAP). The road-level map is mainly composed of road topology information with granularity, the navigation positioning accuracy of the road-level map is low (for example, the precision is about 15 meters), and the road-level map is mainly used for helping a driver to navigate and cannot meet the requirements of autonomous driving. In contrast, the lane-level map and the high-precision map may be used for autonomous driving. The lane-level topology information is added to the lane-level map, and compared with the road-level map, the lane-level map has higher precision which is generally at a sub-meter level, and may include road information (for example, lane lines) and lane-related ancillary facility information (such as traffic signals, street signs, parking spaces, etc.), and may be used to assist autonomous driving. Compared with the lane-level map, the high-precision map has higher map data precision (the precision reaches centimeter level), richer map data types and higher map update frequency, and can be used for autonomous driving. The information of the high-precision map in the three navigation maps is most abundant and the precision is the highest, and the use and update costs are higher. Since the perception is directly responsible for the decision-making in the solutions of the embodiments of the present disclosure, it is possible to realize an autonomous driving technology that emphasizes perception over maps, and thus eliminating the dependence on high-precision maps and ensuring efficient decision-making. Further, the effectiveness of the decision-making can be improved by using the lane-level map as auxillary information.

According to some embodiments, the perception information may include at least one of images acquired by the camera, information acquired by the laser radar, and information acquired by the millimeter-wave radar. It will be understood that the image acquired by the camera may be in the form of a picture or a video, and the information acquired by the laser radar may be a radar point cloud (for example, a three-dimensional point cloud).

According to some embodiments, the multimodal encoding layer 210 is configured to map the first input information to a preset space to obtain an intermediate representation, and process the intermediate representation utilizing the temporal attention mechanism and/or the spatial attention mechanism to obtain an implicit representation $e_t$ corresponding to the first input information.

In some embodiments, the preset space may be a BEV space. Because the processes of perception, prediction, decision making, planning and the like are performed in a three-dimensional space, the image information captured by the camera is only a projection of the real physical world in the perspective view, and the information obtained from the image needs to undergo a complex processing before it can be used, and thus there will be a certain loss of information, and mapping the visual information to the BEV space makes it easier to connect the perception with the planning and control.

In some embodiments, the first input information (for example, the image information in the first input information) may first be input to a backbone network (for example, a backbone network such as ResNet, EfficientNet), and the multi-layer image features may be extracted as an intermediate representation. In addition, the data of the laser radar and the millimeter-wave radar may be directly converted to the BEV space. Subsequently, the desired spatial features can be extracted from the image features by using the spatial self-attention mechanism, thus aggregating the spatial information; in addition, the historical information can be fused by using the temporal self-attention mechanism, thus aggregating the temporal information.

Therefore, the temporal and spatial fusion enables the implicit representation $e_t$ to characterize the rich temporal and spatial information, which further enhances the accuracy and safety of decision making.

According to some embodiments, the target autonomous driving strategy information may include a target planning trajectory Out1.

Figure 3:
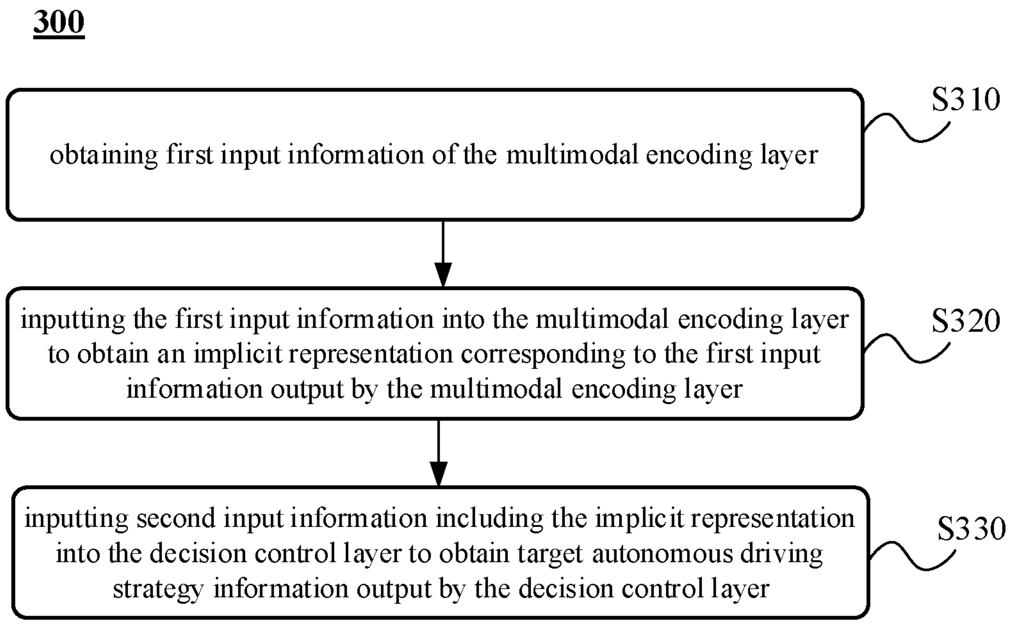
FIG. 3 illustrates a flowchart of an autonomous driving method implemented by using an autonomous driving model, in accordance with some embodiments of the present disclosure.

According to another aspect of the present disclosure, there is provided an autonomous driving method implemented by utilizing the autonomous driving model. FIG. 3 illustrates a flowchart of an autonomous driving method 300 implemented by utilizing the autonomous driving model according to embodiments of the present disclosure. The utilized autonomous driving model includes a multimodal encoding layer and a decision control layer, which are connected to form an end-to-end neural network model such that the decision control layer can obtain autonomous driving strategy information based directly on the output of the multimodal encoding layer. For example, the method 300 may be implemented by using the autonomous driving model 200 as described above.

As shown in FIG. 3, the autonomous driving method 300 includes:

- Step S310, obtaining first input information of the multimodal encoding layer, where the first input information includes navigation information of the target vehicle and perception information for the surrounding environment of the target vehicle obtained by using one or more sensors, where the perception information includes the current perception information and the historical perception information for the surrounding environment of the target vehicle during the vehicle driving process;
- Step S320, inputting the first input information into the multimodal encoding layer to obtain an implicit representation corresponding to the first input information output by the multimodal encoding layer, and
- Step S330, inputting the second input information including the implicit representation to the decision control layer to obtain target autonomous driving strategy information output by the decision control layer.

According to some embodiments, after obtaining the target autonomous driving strategy information (e.g., a target planning trajectory or a target control signal, where the target control signal may, for example, includes a signal controlling the accelerator, the brake, the steering amplitude, etc.), the vehicle is controlled to perform autonomous driving according to the target autonomous driving strategy information.

In step S310, the navigation information of the target vehicle in the first input information may include, for example, vectorized navigation information and vectorized map information, and the vectorized navigation information and the vectorized map information may be obtained by vectorizing one or more of the lane-level or road-level navigation information and the coarse positioning information. In addition, the perception information of the surrounding environment of the target vehicle may include perception information of the one or more cameras, perception information of the one or more laser radars, and perception information of the one or more millimeter-wave radars.

Because the multimodal encoding layer and the decision control layer are connected to form an end-to-end neural network model, the perception information can be directly responsible for the decision making, which can solve the coupling problem between prediction and planning. In addition, the introduction of implicit representation can overcome the problem that the algorithms are prone to failure due to the defective representation of structured information. In addition, because the perception is directly responsible for the decision making, the perception can capture information that is more critical to the decision making, and the accumulation of errors caused by perception errors can be reduced.

Figure 4:
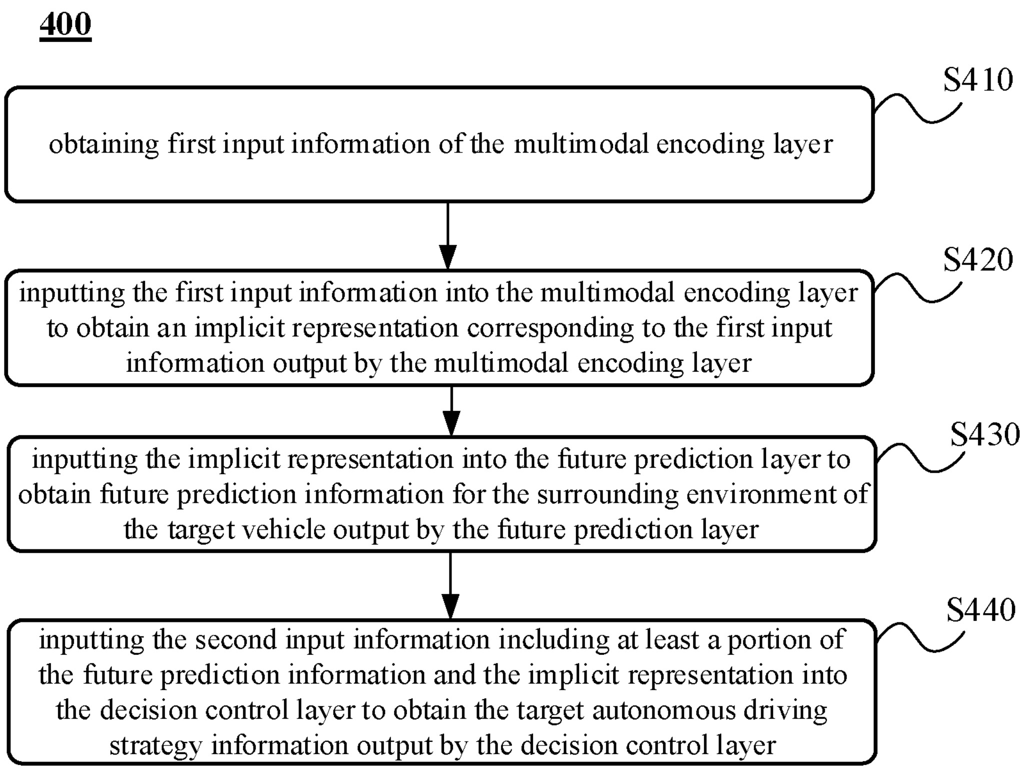
FIG. 4 illustrates a flowchart of an autonomous driving method implemented by using an autonomous driving model, in accordance with other embodiments of the present disclosure.

FIG. 4 illustrates a flowchart of an autonomous driving method 400 implemented by using the autonomous driving model according to other embodiments of the present disclosure.

According to some embodiments, the autonomous driving model may also include a future prediction layer (e.g., the future prediction layer 230 in FIG. 2), and referring to FIG. 4, the autonomous driving method 400 includes:

- Step S410, obtaining first input information of the multimodal encoding layer, the first input information may be similar to the first input information in the method 300 described above with respect to FIG. 3, and details are not described herein again;
- Step S420, inputting the first input information into the multimodal encoding layer to obtain an implicit representation corresponding to the first input information output by the multimodal encoding layer;
- Step S430, inputting the implicit representation into the future prediction layer to obtain future prediction information for the surroundings environment of the target vehicle output by the future prediction layer; and
- Step S440, inputting second input information including at least a portion of the future prediction information and the implicit representation into the decision control layer to obtain target autonomous driving strategy information output by the decision control layer.

Thereby, at least a portion of the information predicted by the future prediction layer is input into the decision control layer as auxiliary information to assist in decision making, which can improve the accuracy and safety of decision making.

Figure 5:
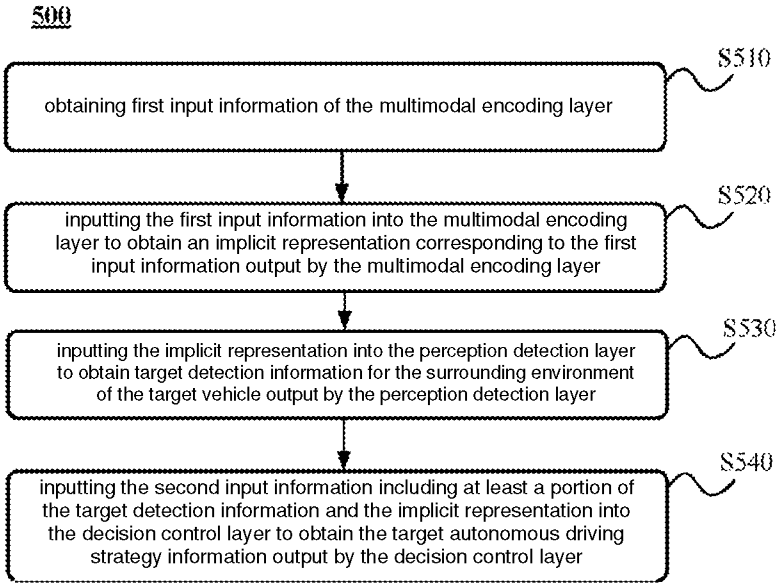
FIG. 5 illustrates a flowchart of an autonomous driving method implemented by using an autonomous driving model, in accordance with other embodiments of the present disclosure.

FIG. 5 illustrates a flowchart of an autonomous driving method 500 implemented by using the autonomous driving model according to other embodiments of the present disclosure.

According to some embodiments, the autonomous driving model may also include a perception detection layer (e.g., the perception detection layer 240 in FIG. 2), and referring to FIG. 5, the autonomous driving method 500 includes:

Step S510, obtaining first input information of the multimodal encoding layer, the first input information may be similar to the first input information in the method 300 described above with respect to FIG. 3, and details are not described herein again;

Step S520, inputting the first input information into the multimodal encoding layer to obtain an implicit representation corresponding to the first input information output by the multimodal encoding layer;

Step S530, inputting the implicit representation into the perception detection layer to obtain target detection information for the surrounding environment of the target vehicle output by the perception detection layer, the target detection information includes current detection information and historical detection information, where the current detection information includes a plurality of road surface elements and the types and the current state information of obstacles in the surrounding environment of the target vehicle, and the historical detection information includes the types and the historical state information of a plurality of obstacles in the surrounding environment of the target vehicle; and Step S540, inputting second input information including at least a portion of the target detection information and the implicit representation into the decision control layer to obtain the target autonomous driving strategy information output by the decision control layer.

Thereby, at least a portion of the information predicted by the perception detection layer is input into the decision control layer as auxiliary information to assist in decision making, which may enable the detection information for the current and historical period of time for the surrounding environment of the vehicle to be used to assist in decision making, thereby improving the accuracy and safety of decision making.

Figure 6:
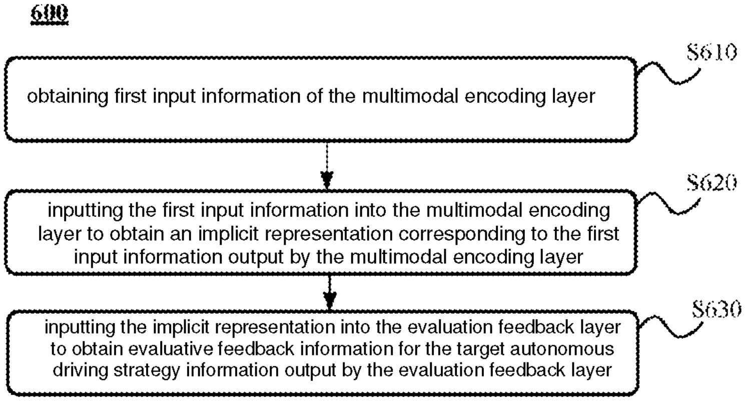
FIG. 6 illustrates a flowchart of an autonomous driving method implemented by using an autonomous driving model, in accordance with other embodiments of the present disclosure.

FIG. 6 illustrates a flowchart of an autonomous driving method 600 implemented by using the autonomous driving model according to other embodiments of the present disclosure.

According to some embodiments, the autonomous driving model may also include an evaluation feedback layer (e.g., the evaluation feedback layer 250 in FIG. 2), and referring to FIG. 6, the autonomous driving method 600 includes:

Step S610, obtaining first input information of the multimodal encoding layer, the first input information may be similar to the first input information in the method 300 described above with respect to FIG. 3, and details are not described herein again;

Step S620, inputting the first input information into the multimodal encoding layer to obtain an implicit representation corresponding to the first input information output by the multimodal encoding layer; and Step S630, inputting the implicit representation into the evaluation feedback layer to obtain evaluation feedback information for the target autonomous driving strategy information output by the evaluation feedback layer.

Thereby, through the evaluation feedback layer, it may be indicated that whether the current driving behavior originates from a human driver or a model, whether the current driving is comfortable, whether the current driving violates traffic rules, and whether the current driving is dangerous driving, thereby improving user experience.

According to some embodiments, when the autonomous driving model includes a future prediction layer and a perception detection layer, the foregoing step S630 may include: inputting at least a portion of one or both of the future prediction information and the target detection information, and the implicit representation into the evaluation feedback layer to obtain evaluation feedback information for the target autonomous driving strategy information output by the evaluation feedback layer. Thereby, the detection information and the future prediction information for a current and historical period of time for the surrounding environment of the vehicle can be used to assist in the evaluation, and thus improving the accuracy of the evaluation.

According to some embodiments, the above step S630 may include: inputting the implicit representation and the target autonomous driving strategy information into the evaluation feedback layer to obtain evaluation feedback information for the target autonomous driving strategy information output by the evaluation feedback layer. Therefore, the evaluation feedback is assisted based on the autonomous driving strategy information, which may further improve the accuracy of the evaluation.

Figure 7:
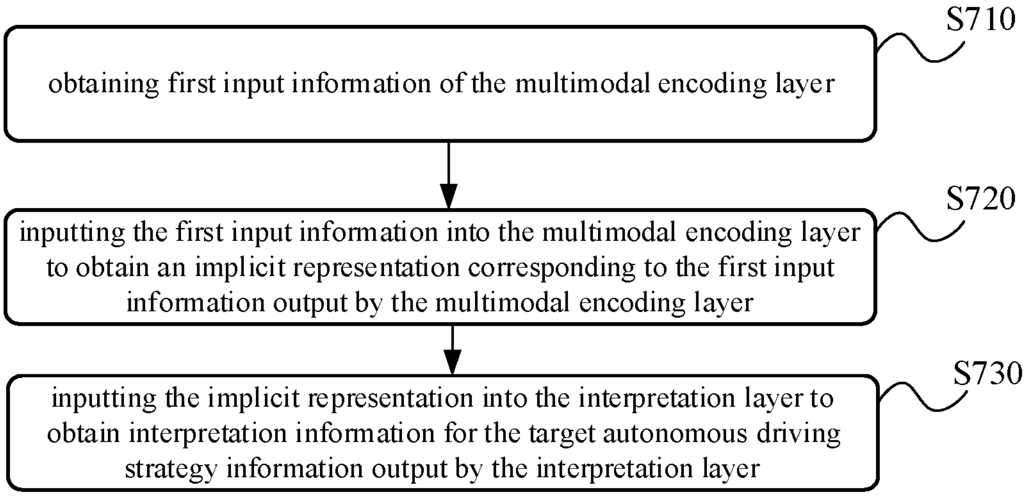
FIG. 7 illustrates a flowchart of an autonomous driving method implemented by using an autonomous driving model, in accordance with other embodiments of the present disclosure.

FIG. 7 illustrates a flowchart of an autonomous driving method 700 implemented by using the autonomous driving model according to other embodiments of the present disclosure.

According to some embodiments, the autonomous driving model may also include an interpretation layer (e.g., the interpretation layer 260 in FIG. 2), and with reference to FIG. 7, the autonomous driving method 700 includes:

Step S710, obtaining first input information of the multimodal encoding layer, the first input information may be similar to the first input information in the method 300 described above with respect to FIG. 3, and details are not described herein again;

Step S720, inputting the first input information into the multimodal encoding layer to obtain an implicit representation corresponding to the first input information output by the multimodal encoding layer; and Step S730, inputting the implicit representation into the interpretation layer to obtain interpretation information for the target autonomous driving strategy information output by the interpretation layer, the interpretation information can characterize the decision category of the target autonomous driving strategy information.

Therefore, interpretation information related to the target autonomous driving strategy information can be provided to the passenger during the autonomous driving process, which enhances the interpretability of the autonomous driving strategy, thereby enhancing user experience.

In some embodiments, the interpretation layer may categorize the target autonomous driving strategy information, each category may be mapped to a predefined natural language sentence. For example, the interpretation information may include natural language sentences such as "a lane change is currently required", "there is a traffic light ahead and therefore need to slow down", and "surrounding vehicles may need to merge in", etc. In addition, the interpretation layer may be a decoder in the Transformer to decode to obtain a natural language sentence for the interpretation of the driving strategy.

According to some embodiments, when the autonomous driving model includes a future prediction layer and a perception detection layer, the above step S730 may include: inputting at least a portion of one or both of the future prediction information and the target detection information, and the implicit representation into the interpretation layer to obtain interpretation information for the target autonomous driving strategy information output by the interpretation layer. Thereby, the target detection information and the future prediction information for a current and historical period of time for the surrounding environment of the vehicle can be used to assist in the interpretation, thereby further enhancing the accuracy and rationality of the interpretation.

According to some embodiments, the above step S730 may include: inputting the implicit representation and the target autonomous driving strategy information into the interpretation layer to obtain the interpretation information for the target autonomous driving strategy information output by the interpretation layer. Thereby, the autonomous driving strategy information is used to assist in the interpretation, which may further improve the accuracy of the interpretation.

According to some embodiments, the autonomous driving method may further includes:

Obtaining the real driving data in the process of controlling the target vehicle to perform the automatic driving by using the above autonomous driving model, and the real driving data includes navigation information of the target vehicle, real perception information for the surrounding environment of the target vehicle and real autonomous driving strategy information. The real driving data is used to perform iterative training on the autonomous driving model.

The navigation information of the target vehicle in the real driving data may include vectorized navigation information and vectorized map information, and the vectorized navigation information and the vectorized map information may be obtained by vectorizing one or more of the lane-level or road-level navigation information and the coarse positioning information. The real perception information may include perception information of the one or more cameras on the vehicle in a real road scenario, perception information of the one or more laser radars, and perception information of the one or more millimeter-wave radars. It is to be understood that the perception information for the surrounding environment of the target vehicle is not limited to one of the forms described above, for example, only perception information of a plurality of cameras may be included, and perception information of the one or more laser radars and perception information of the one or more millimeter-wave radars may not be included. The perception information acquired by the camera may be perception information in the form of a picture or a video, and the perception information acquired by the laser radar may be perception information in the form of a radar point cloud (e.g., a three-dimensional point cloud). The real autonomous driving strategy information may include a planned trajectory of the autonomous driving vehicle or control signals for the vehicle (e.g., signals for controlling the throttle, the brake, the steering amplitude, etc.) collected in a real road scenario.

According to some embodiments, the autonomous driving method may further includes:

- controlling the target vehicle to perform autonomous driving again by using the autonomous driving model obtained by iterative training.

Therefore, in the real vehicle driving process, the autonomous driving task and the model training task can be synchronously carried out, the autonomous driving model can be trained based on the real driving data, the decision making efficiency can be ensured, the autonomous driving behavior can be well aligned to the preference of human passengers, thus improving the user experience and avoiding the long learning process of cold start.

In some embodiments, the target vehicle may be controlled to perform the autonomous driving again using the planned trajectory predicted by the autonomous driving model or control signals for the vehicle (e.g., signals for controlling the throttle, the brake, the steering amplitude, etc.). For example, the trajectory planning may be interpreted by using a control strategy module in the autonomous driving vehicle to obtain control signals for the vehicle; or a neural network may be used to directly output control signals for the vehicle based on the implicit representation.

The real driving data in the process of controlling the target vehicle to perform the autonomous driving using the above autonomous driving model may be obtained at a preset time interval, and continuous iterative training is performed on the automatic driving model based on the newly obtained real driving data.

Figure 8:
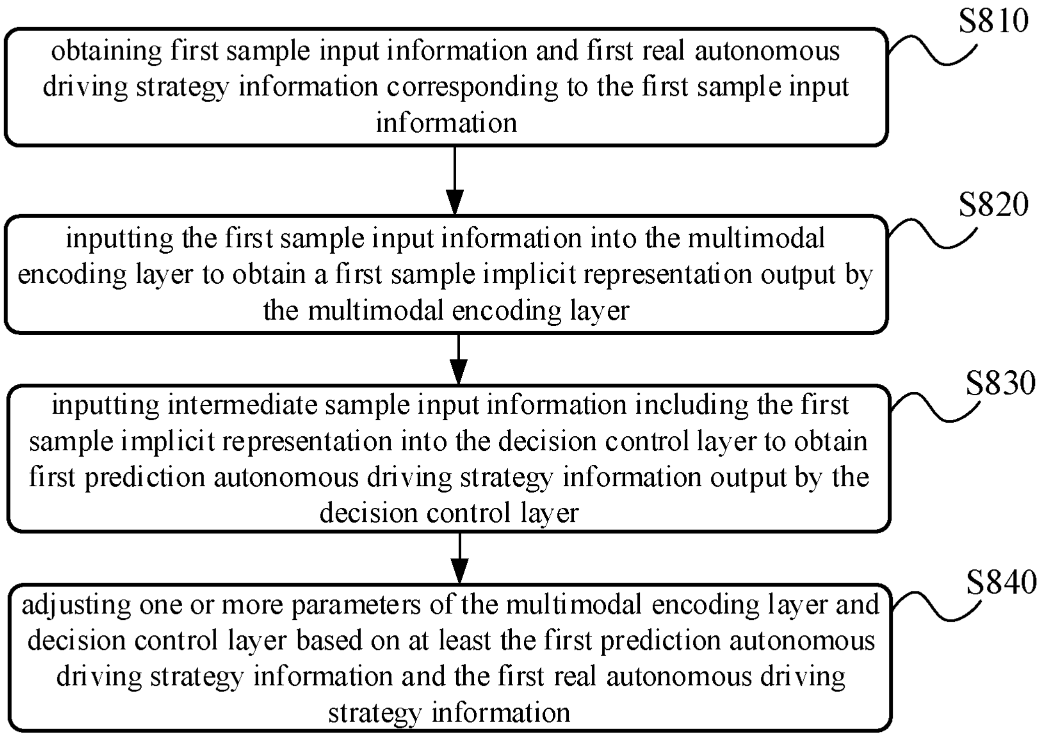
FIG. 8 illustrates a flowchart of a training method for an autonomous driving model, in accordance with some embodiments of the present disclosure.

According to another aspect of the present disclosure, there is provided a training method for the autonomous driving model. FIG. 8 illustrates a flowchart of a training method for the autonomous driving model according to embodiments of the present disclosure. The autonomous driving model includes a multimodal encoding layer and a decision control layer, and the multimodal encoding layer and the decision control layer are connected to form an end-to-end neural network model such that the decision control layer obtains autonomous driving strategy information based directly on the output of the multimodal encoding layer. In some embodiments, the autonomous driving model to be trained may utilize a Transformer network structure having an encoder and a decoder. It will be understood that the autonomous driving model to be trained may also be other neural network models based on the Transformer network structure, no limitation is made herein. For example, the autonomous driving model may be the autonomous driving model 200 described above.

The training method for the autonomous driving model includes a first training process 800 for training the multimodal encoding layer and the decision control layer, as shown in FIG. 8, the first training process 800 includes:

- Step S810: obtaining first sample input information and first real autonomous driving strategy information corresponding to the first sample input information, where the first sample input information includes first sample navigation information of the first sample vehicle and sample perception information for the surrounding environment of the first sample vehicle, where the sample perception information includes current sample perception information and historical sample perception information for the surrounding environment of the first sample vehicle;
- Step S820, inputting the first sample input information into the multimodal encoding layer to obtain a first sample implicit representation output by the multimodal encoding layer;
- Step S830, inputting intermediate sample input information including the first sample implicit representation into the decision control layer to obtain first prediction autonomous driving strategy information output by the decision control layer; and
- Step S840, adjusting the one or more parameters of the multimodal encoding layer and the decision control layer based on at least the first prediction autonomous driving strategy information and the first real autonomous driving strategy information.

In step S810, the first sample navigation information may include vectorized navigation information and vectorized map information, and the vectorized navigation information and the vectorized map information may be obtained by vectorizing one or more of the lane-level or road-level navigation information and the coarse positioning information. The sample perception information may include perception information of the one or more cameras on the first sample vehicle, perception information of the one or more laser radars, and perception information of the one or more millimeter-wave radars. It can be understood that the sample perception information may include only the perception information of a plurality of cameras, and the perception information of one or more laser radars and the perception information of one or more millimeter-wave radars may not be included. The perception information acquired by the camera may be perception information in the form of a picture or a video, and the perception information acquired by the laser radar may be perception information in the form of a radar point cloud (e.g., a three-dimensional point cloud). In some embodiments, the above-mentioned different forms of sample information (pictures, videos, point clouds), etc., may be directly input to the multimodal encoding layer without preprocessing.

In some embodiments, the first sample input information may be collected during a real vehicle driving process, for example, being collected by a manually-driven vehicle with autonomous driving sensors in a real road scenario, and the first real autonomous driving strategy information may be driving trajectory data of the vehicle during a driving process in a real road scenario (including control signals for the vehicle recorded during the driving process). In addition, In some embodiments, the first sample input information may include sample data collected by the real vehicle during the driving process in a real road scenario and sample data collected by the emulated vehicle during the driving process in an emulated road scenario.

Because the multimodal encoding layer and the decision control layer of the model to be trained are connected to form an end-to-end neural network model, the perception information in the sample information can be directly responsible for the decision making, which can solve the coupling problem between the prediction and the planning of the autonomous driving model obtained by training. In addition, the introduction of implicit representation can overcome the problem that the algorithms are prone to failure due to the defective representation of structured information. In addition, because the perception information in the sample information can be directly responsible for decision making, the perception can capture information that is more critical to the decision making, and the error accumulation caused by perception errors in the model obtained by training is reduced.

Figure 9:
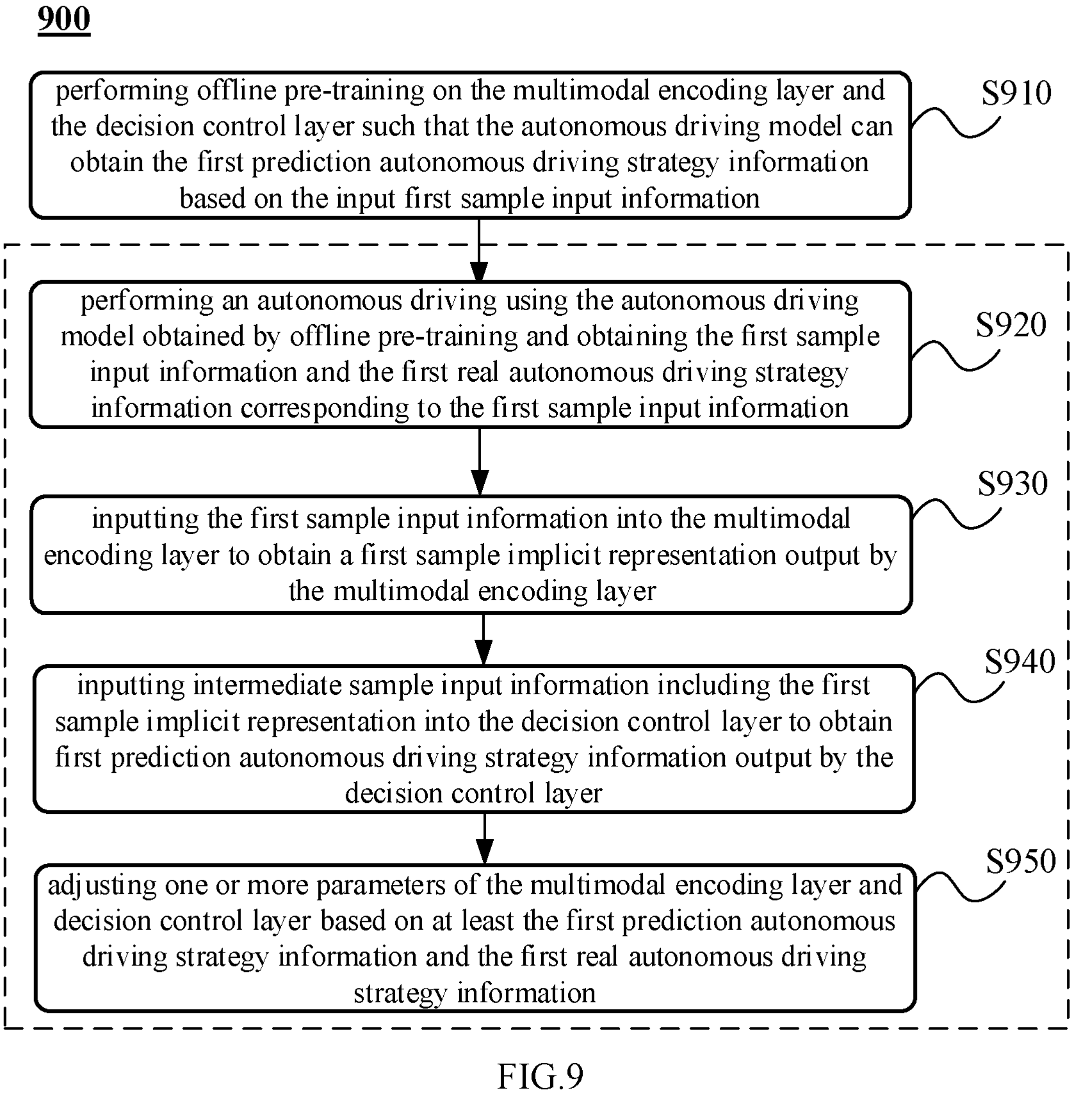
FIG. 9 illustrates a flowchart of a training method for an autonomous driving model, in accordance with other embodiments of the present disclosure.

FIG. 9 illustrates a flowchart of a training method 900 for the autonomous driving model according to other embodiments of the present disclosure.

According to some embodiments, referring to FIG. 9, the method 900 includes:

Step S910, before the first training process, performing offline pre-training on the multimodal encoding layer and the decision control layer, so that the autonomous driving model can obtain first prediction autonomous driving strategy information based on the first sample input information;

As shown in the steps in the dashed box in FIG. 9, the first training process includes:

Step S920, performing autonomous driving using the autonomous driving model obtained by offline pre-training, and obtaining first sample input information and first real autonomous driving strategy information corresponding to the first sample input information during the autonomous driving process;

Step S930, inputting the first sample input information into the multimodal encoding layer to obtain a first sample implicit representation output by the multimodal encoding layer;

Step S940, inputting intermediate sample input information including the first sample implicit representation into the decision control layer to obtain first prediction autonomous driving strategy information output by the decision control layer; and Step S950, adjusting one or more parameters of the multimodal encoding layer and the decision control layer based on at least the first prediction autonomous driving strategy information and the first real autonomous driving strategy information.

During offline pre-training, the model is not deployed on a real vehicle traveling in a real road scenario, and the offline pre-training is performed on the autonomous driving model such that the model obtained by training has a preliminary autonomous driving capability, and on this basis, a real vehicle model training is further performed. Therefore, not only can the safety and reliability of the model training process be improved, but also the overall efficiency of the model training can be improved.

In some embodiments, the sample data used in the offline pre-training phase may be collected by the autonomous vehicle during autonomous driving (e.g., L4-level autonomous driving) or during manual driving. In addition, the offline pre-training may also be performed in an emulated environment.

Figure 10:
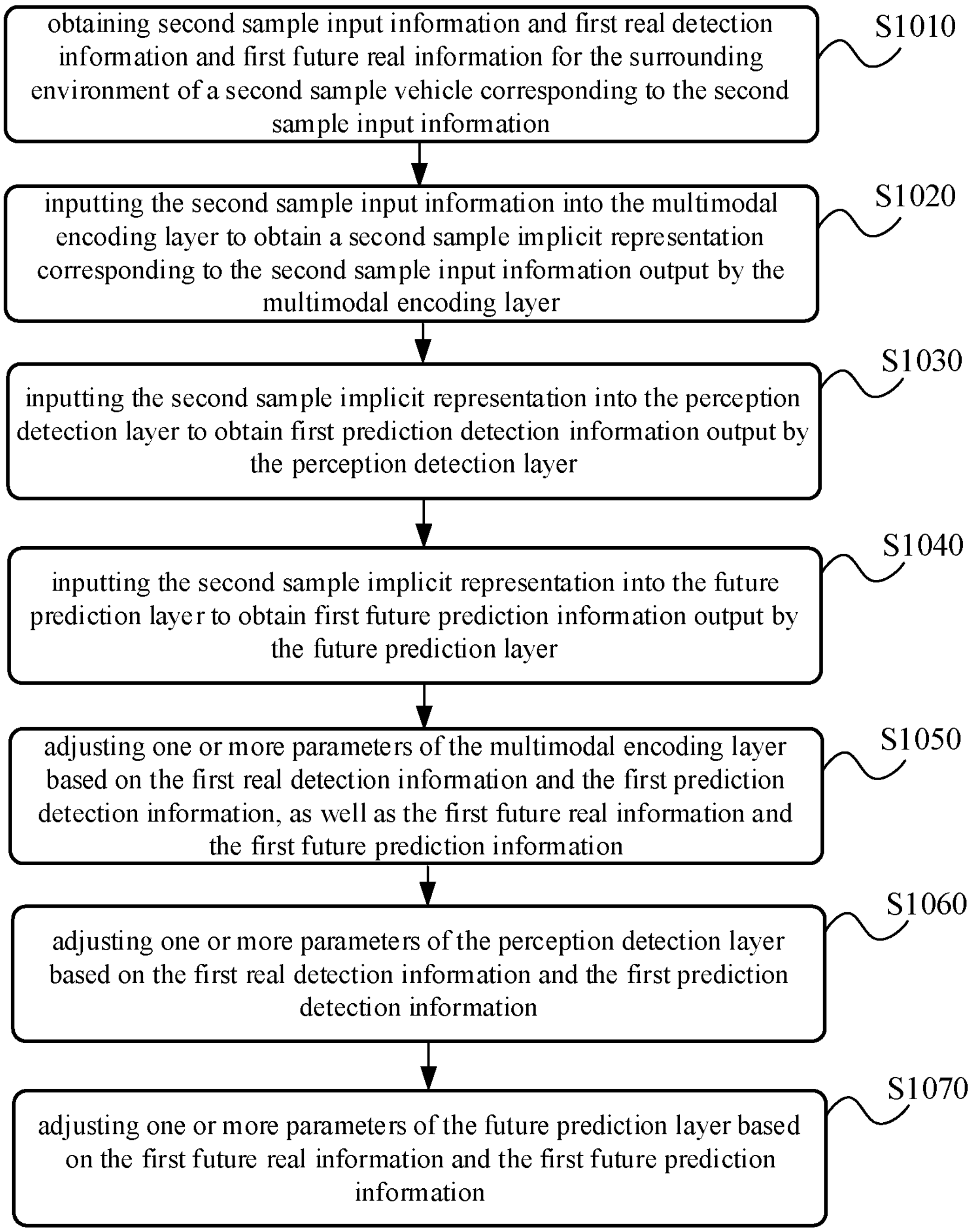
FIG. 10 illustrates a flowchart of the partial process of a training method of an autonomous driving model, in accordance with some embodiments of the present disclosure.

FIG. 10 illustrates a flowchart of a portion of a process of a training method for the autonomous driving model according to embodiments of the present disclosure. According to some embodiments, the autonomous driving model may also include a perception detection layer and a future prediction layer. As shown in FIG. 10, the above step S910 may include:

Step S1010, obtaining second sample input information, and first real detection information and first future real information of the surrounding environment of a second sample vehicle corresponding to the second sample input information, where the first real detection information includes the types and the real current state information and the real historical state information of a plurality of real sample obstacles in the surrounding environment of the second sample vehicle, and the types and the real current state information of a plurality of prediction sample road surface elements;

Step S1020, inputting the second sample input information into the multimodal encoding layer to obtain a second sample implicit representation corresponding to the second sample input information output by the multimodal encoding layer;

Step S1030, inputting the second sample implicit representation into the perception detection layer to obtain first prediction detection information output by the perception detection layer, where the first prediction detection information includes the types and the prediction current state information and the prediction historical state information of a plurality of prediction sample obstacles in the surrounding environment of the second sample vehicle, and the types and the prediction current state information of a plurality of prediction sample road surface elements;

Step S1040, inputting the second sample implicit representation into the future prediction layer to obtain first future prediction information output by the future prediction layer;

Step S1050: Adjusting the one or more parameters of the multimodal encoding layer based on the first real detection information and the first prediction detection information, as well as the first future real information and the first future prediction information;

Step S1060, adjusting the one or more parameters of the perception detection layer based on the first real detection information and the first prediction detection information; and Step S1070, adjusting the one or more parameters of the future prediction layer based on the first future real information and the first future prediction information.

The second sample input information ($x_t$) may be collected by the autonomous vehicle during autonomous driving (e.g., L4-level autonomous driving) or during manual driving, or may be an input sample obtained in a emulated environment. For example, the second sample input information may include sensor (e.g., cameras, radars) perception information, map information, or navigation information.

The first real detection information $$(s_t^{gt})$$

may be manually annotated information. For example, for data ($x_1, x_2 \ldots, x_t, \ldots$) collected by an autonomous driving vehicle (including an manually driven vehicle with an autonomous driving sensors), manual annotation may be performed on the road surface elements and the obstacles therein, so as to obtain $$(s_1^{gt}, s_2^{gt}, \ldots, s_t^{gt}, \ldots).$$

for example a bounding box in a three-dimensional space, and the real category, the real current state, etc. of the corresponding obstacles in the bounding box can be annotated. For example, the real size and position of the corresponding obstacles in the bounding box, and the type of vehicles, the current state of the vehicles (e.g., the long-tail information such as whether or not the turn signals, high beams are turned on), the position and length of the lane lines, etc. may be annotated. In addition, the first real detection information $$(s_t^{gt})$$

may be self-annotated information, that is, for the data ($x_1, x_2 \ldots, x_t, \ldots$) collected by the autonomous vehicle (including the manually driven vehicle with autonomous driving sensors), it may first be annotated by relying on a perception model (or a perception output with a training model), and then checked and corrected manually to obtain $$(s_1^{gt}, s_2^{gt}, \ldots, s_t^{gt}, \ldots).$$

Accordingly, the first prediction detection information ($s_t$) is the prediction result output by the perception detection layer, which may include a prediction bounding box in the three-dimensional space, and may include the real category, the real current state, and the like of a corresponding obstacle in the prediction bounding box.

Correspondingly, the first future real information $$(s_{t+\Delta t}^{gt})$$

is similar to the first real detection information $$(s_t^{gt}),$$

but the first future real information $$(s_{t+\Delta t}^{gt})$$

indicates detection information at a future moment.

Accordingly, the first future prediction information ($\hat{s}_{t\rightarrow t+\Delta t}$) is similar to the first prediction detection information ($s_t$), but the first future prediction information ($\hat{s}_{t\rightarrow t+\Delta t}$) indicates prediction information at a future moment.

Thereby, in step S1050, adjusting the one or more parameters of the multimodal encoding layer based on the first real detection information $$(s_t^{gt})$$

and the first prediction detection information ($s_t$), as well as the first future real information $$(s_{t+\Delta t}^{gt})$$

and the first future prediction information ($\hat{s}_{t\rightarrow t+\Delta t}$). In step S1060, adjusting the one or more parameters of the perception detection layer based on the first real detection information $$(s_t^{gt})$$

and the first prediction detection information ($s_t$). In step S1070, adjusting the one or more parameters of the future prediction layer based on the first future real information $$(s_{t+\Delta t}^{gt})$$

and the first future prediction information ($\hat{s}_{t\rightarrow t+\Delta t}$).

In some embodiments, any of steps S1050 to S1070 may be performed by using supervised learning and self-supervised learning. For example, the parameters of the multimodal encoding layer and the perception detection layer may be adjusted using the objective function in Equation (1) as follows:

$$L_{SL} = \sum_t D(s_t, s_t^{gt}) \qquad \text{Equation (1)}$$

where D denotes certain measure for measuring the distance between the first prediction detection information ($s_t$) and the first real detection information $$(s_t^{gt}).$$

Unless otherwise specified, all D in the following may denote a similar measure.

For example, the parameters of the multimodal encoding layer and the future prediction layer may be adjusted using the objective function in Equation (2) as follows:

$$L_{SSL} = \sum_t D(\hat{s}_{t \to t+\Delta t}, s_{t+\Delta t}^{gt}) \quad \text{Equation (2)}$$

Alternatively, when there is not enough annotated first future real information $$(s_{t+\Delta t}^{gt}),$$

the parameters of the multimodal encoding layer and the future prediction layer can be adjusted based on self-labeling using the objective function in Equation (3) as follows:

$$L_{SSL} = \sum_t D(\hat{s}_{t \to t+\Delta t}, s_{t+\Delta t}) \quad \text{Equation (3)}$$

where ($s_{t+\Delta t}$) may be the output of the perception detection layer of the model to be trained.

Therefore, during model training, cooperative parameter adjustment is further performed through the perception detection layer and the future prediction layer and the multimodal encoding layer, so that the learning effect of the multimodal encoding layer can be further improved.

In the above steps, the multimodal encoding layer is pre-trained by using the perception detection layer and the future prediction layer, and it can be understood that the multimodal encoding layer may be pre-trained only by using the perception detection layer or the future prediction layer, and the specific implementation process is similar to that described above, and details are not described in detail.

Figure 11:
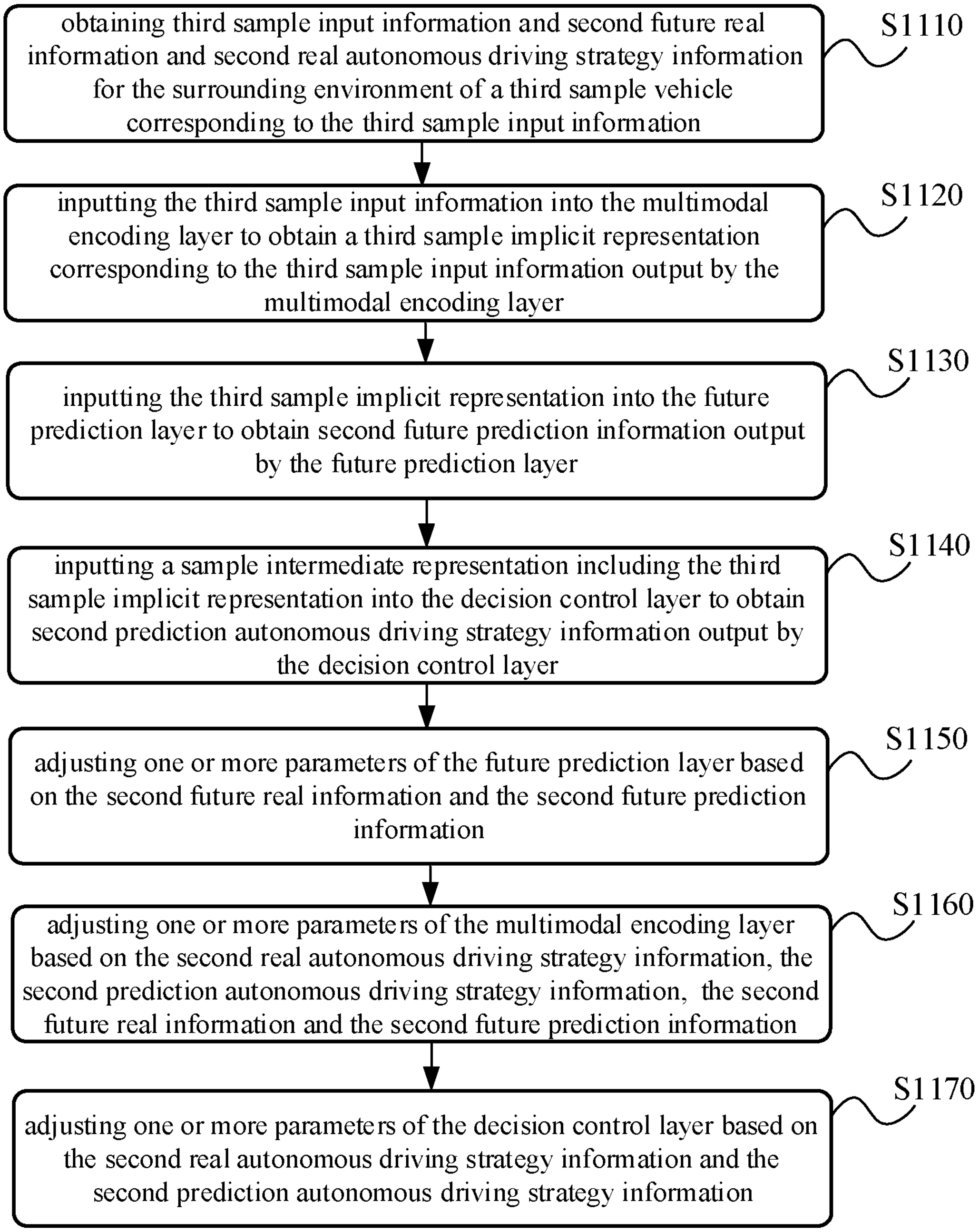
FIG. 11 illustrates a flowchart of the partial process of a training method of an autonomous driving model, in accordance with some embodiments of the present disclosure.

FIG. 11 illustrates a flowchart of a partial process of a training method for the autonomous driving model according to embodiments of the present disclosure. According to some embodiments, the autonomous driving model may also include a future prediction layer. And as shown in FIG. 11, the above step S910 may include:

- Step S1110, obtaining third sample input information and second future real information and second real autonomous driving strategy information of the surrounding environment of third sample vehicle corresponding to the third sample input information;
- Step S1120, inputting the third sample input information into the multimodal encoding layer to obtain a third sample implicit representation corresponding to the third sample input information output by the multimodal encoding layer;
- Step S1130, inputting the third sample implicit representation into the future prediction layer to obtain second future prediction information output by the future prediction layer;
- Step S1140, inputting a sample intermediate representation including the third sample implicit representation into the decision control layer to obtain second prediction autonomous driving strategy information output by the decision control layer;
- Step S1150: adjusting the one or more parameters of the future prediction layer based on the second future real information and the second future prediction information;
- Step S1160, adjusting the one or more parameters of the multimodal encoding layer based on the second real autonomous driving strategy information and the second prediction autonomous driving strategy information, as well as the second future real information and the second future prediction information; and
- Step S1170, adjusting the one or more parameters of the decision control layer based on the second real autonomous driving strategy information and the second prediction autonomous driving strategy information.

The third sample input information ($x_t$) may be similar to the second sample input information above; and the second future real information $$(s_{t+\Delta t}^{gt})$$

may be similar to the first future true information above, and therefore details are not described herein.

The second real autonomous driving strategy information $$(y_1^{ref}, \ldots, y_t^{ref})$$

may be trajectory data of manual driving. Accordingly, the second prediction autonomous driving strategy information ($y_t$) is the prediction result (the trajectory planning) output by the decision control layer.

Thereby, the parameters of the multimodal encoding layer and the decision control layer can be adjusted. For example, a behavioral imitation training approach can be applied to adjust the parameters of the multimodal encoding layer and the decision control layer by using the objective function in Equation (4) as follows:

$$L_{BC} = \sum_t D(y_t^{ref}, y_t) \quad \text{Equation (4)}$$

Therefore, during model training, cooperative parameter adjustment is further performed through the future prediction layer and the multimodal encoding layer, and the decision control layer, so that the learning effect of the multimodal encoding layer and the decision control layer can be further improved.

It will be understood that, in this embodiment, the method for adjusting the parameters of the future prediction layer described in FIG. 10 may be used for the parameter adjustment of the future prediction layer.

According to some embodiments, with continued reference to FIG. 11, performing offline pre-training on the multimodal encoding layer and the decision control layer may include: inputting the third sample input information into the driving strategy prediction model to obtain the second autonomous driving strategy real information output by the driving strategy prediction model.

Under the condition that the existing real autonomous driving strategy information is limited, the driving strategy prediction model may be used to obtain the pseudo-labeled trajectory data based on the existing trajectory-free labeled driving data. In some embodiments, the sample input information ($x_t$) (e.g., perception information of sensors) may be input into the driving strategy prediction model to predict a corresponding trajectory plan ($y_t$). The predicted trajectory plan ($y_t$) can be used as the second autonomous driving strategy real information during the offline pre-training process of the multimodal encoding layer and the decision control layer. Thereby, the offline pre-training process can be completed under the condition that the existing real autonomous driving strategy information is limited.

According to some embodiments, the future prediction information may include at least one of the following: the future prediction perception information for the surrounding environment of the sample vehicle (e.g., the sensor information at a future moment $\hat{x}_{t\to t+\Delta t}$, where the sensor information at a future moment includes the camera input information or the radar input information at a future moment), the future prediction implicit representation corresponding to the future prediction perception information (e.g., the implicit representation of the BEV space at a future moment), and the future prediction detecting information for the surrounding environment of the sample vehicle (e.g., the position of an obstacle at a future moment $\hat{s}_{t\to t+\Delta t}$). And the future prediction detection information may include the types and the future prediction state information of a plurality of prediction sample obstacles in the surrounding environment of the sample vehicle (including the size of the obstacles and various long-tail information).

Figure 12:
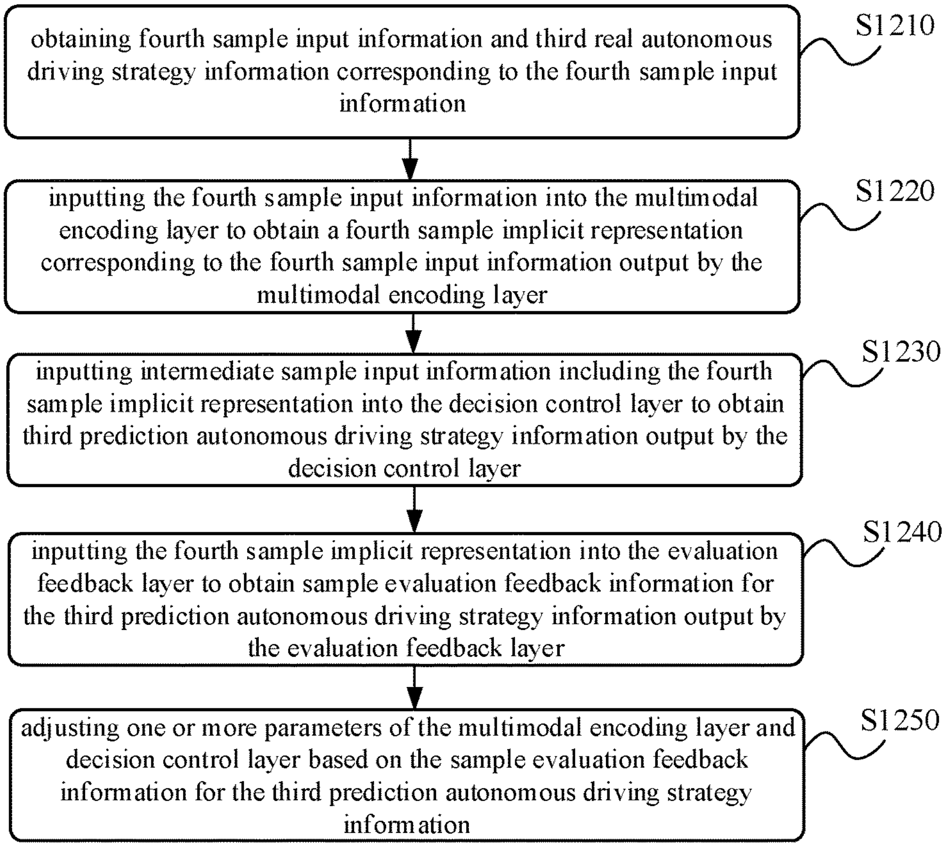
FIG. 12 illustrates a flowchart of the partial process of a training method of an autonomous driving model, in accordance with some embodiments of the present disclosure.

FIG. 12 illustrates a flowchart of a partial process of a training method for the autonomous driving model according to embodiments of the present disclosure. According to some embodiments, the autonomous driving model may further include an evaluation feedback layer. Referring to FIG. 12, the above step S910, performing offline pre-training on the multimodal encoding layer and the decision control layer may further include:

- Step S1210, obtaining fourth sample input information and third real autonomous driving strategy information corresponding to the fourth sample input information;
- Step S1220, inputting the fourth sample input information into the multimodal encoding layer to obtain a fourth sample implicit representation corresponding to the fourth sample input information output by the multimodal encoding layer;
- Step S1230, inputting intermediate sample input information including the fourth sample implicit representation into the decision control layer to obtain third prediction autonomous driving strategy information output by the decision control layer;
- Step S1240, inputting the fourth sample implicit representation into the evaluation feedback layer to obtain sample evaluation feedback information for the third prediction autonomous driving strategy information output by the evaluation feedback layer;
- Step S1250, adjusting one or more parameters of the multimodal encoding layer and the decision control layer based on the sample evaluation feedback information for the third prediction autonomous driving strategy information, the third prediction autonomous driving strategy information, and the third real autonomous driving strategy information.

The fourth sample input information ($x_t$) may be similar to the second sample input information or the third sample input information above; and the third real autonomous driving strategy information $$\left(y_1^{ref}, \ldots, y_t^{ref}\right)$$

may be similar to the second real autonomous driving strategy information above; accordingly, the third prediction autonomous driving strategy information ($y_t$) is the prediction result (the trajectory planning) output by the decision control layer, and therefore details are not described herein.

The sample evaluation feedback information may, for example, indicate whether the current driving behavior originates from a human driver or a model, whether the current driving is comfortable, whether the current driving violates traffic rules, and whether the current driving is dangerous driving, etc.

Therefore, by further utilizing the sample evaluation feedback information, the evaluation feedback layer, the multi-modal coding layer and the decision control layer are subjected to cooperative parameter adjustment, so that the learning effect of the multimodal encoding layer and the decision control layer can be further improved.

In some embodiments, the parameters of the multimodal encoding layer and the decision control layer may be adjusted by using a reinforcement learning approach. For example, the reinforcement learning may be performed based on the third prediction autonomous driving strategy information ($y_1, \ldots, y_t$), the third real autonomous driving strategy information $$\left(y_1^{ref}, \ldots, y_t^{ref}\right)$$

and the sample evaluation feedback information ($r_1, \ldots, r_t$).

In some embodiments, the reinforcement learning may be performed using a PPO algorithm or a SAC algorithm.

In the example, the parameters of the multimodal encoding layer and the decision control layer may be adjusted by using the objective function in Equation (5) as follows:

$$L_{RL} = \alpha \sum\nolimits_t \left(A_t \left(y_t - y_t^{ref}\right)^2\right) \quad \text{Equation (5)}$$

where $A_t$ may indicate the Advantage Function (AF) of the time t, and $A_t$ can be obtained based on the sample evaluation feedback information ($r_1, \ldots, r_t$), $\alpha$ can be a hyperparameter used for adjusting the magnitude of the loss value.

Figure 13:
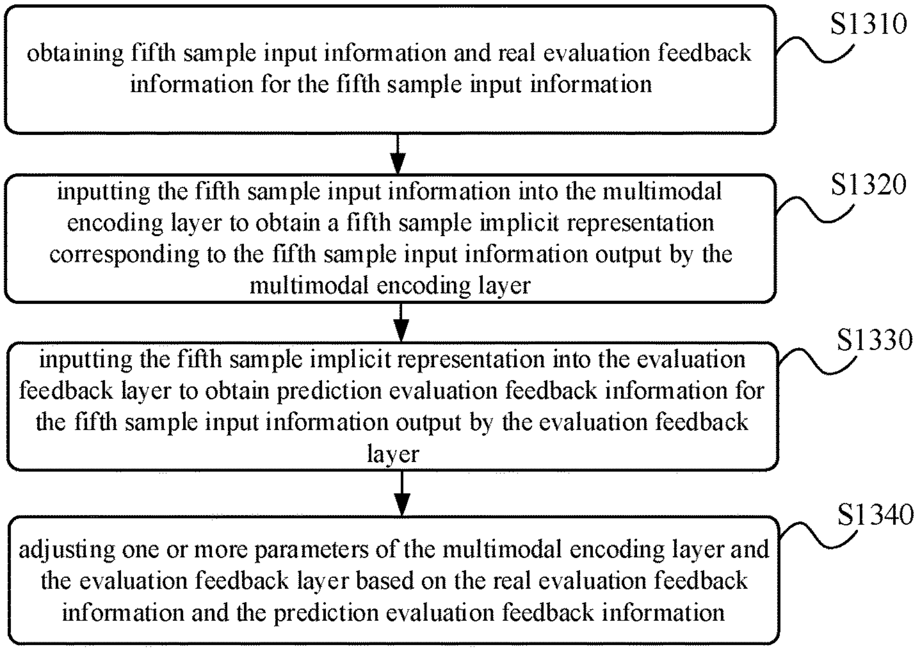
FIG. 13 illustrates a flowchart of the partial process of a training method of an autonomous driving model, in accordance with some embodiments of the present disclosure.

FIG. 13 illustrates a flowchart of a partial process of a training method for the autonomous driving model according to embodiments of the present disclosure. According to some embodiments, the evaluation feedback layer may be obtained separately by training. Referring to FIG. 13, the training process of the evaluation feedback layer may include:

- Step S1310, obtaining fifth sample input information and real evaluation feedback information for the fifth sample input information;
- Step S1320, inputting the fifth sample input information into the multimodal encoding layer to obtain a fifth sample implicit representation corresponding to the fifth sample input information output by the multimodal encoding layer;

Step S1330, inputting the fifth sample implicit representation into the evaluation feedback layer to obtain prediction evaluation feedback information for the fifth sample input information output by the evaluation feedback layer; and Step S1340, adjusting the one or more parameters of the multimodal encoding layer and the evaluation feedback layer based on the real evaluation feedback information and the prediction evaluation feedback information.

The fifth sample input information ($x_t$) may be similar to the second sample input information, the third sample input information, or the fourth sample input information above, therefore, details are not described again.

The real evaluation feedback $$\left(r_t^{ref}\right)$$

may be evaluation feedbacks feedbacked manually (the evaluation for the driving experience of the autonomous driving vehicle from a passenger or a driver), for example, it may indicate whether the current driving behavior originates from a human driver or a model, whether the current driving is comfortable, whether the current driving violates traffic rules, and whether the current driving is dangerous.

Accordingly, the prediction evaluation feedback information ($r_t$) is the prediction result output by the evaluation feedback layer.

In some embodiments, the parameters of the multimodal encoding layer and the evaluation feedback layer may be adjusted by using the objective function in Equation (6) as follows:

$$L_{RM} = D\left(r_t^{ref}, r_t\right) \quad \text{Equation (6)}$$

In some embodiments, a function may first be learned using feedback modeling to predict the feedback information. In other words, the model itself may predict the expected gain obtained by the current driving trajectory (i.e., the prediction result output by the evaluation feedback layer mentioned above). For example, the following equation (7) may be used to determine ($r_t$):

$$r_t = R(x_t, \ldots, x_{t-l+1}) \quad \text{Equation (7)}$$

where ($x_t$, . . . , $x_{t-l+1}$) may be the sample input information.

According to some embodiments, the real evaluation feedback information $$\left(r_t^{ref}\right)$$

may include at least one of the following: information related to driving comfortability, information related to driving safety, driving efficiency, whether or not driving lights are used in a civilized manner, information related to the source of the driving behavior, and information related to whether or not traffic rules are violated.

When performing reinforcement learning training on a real vehicle, the autonomous driving model may be required to predict some errors or failure results, or the target vehicle may even be required to collide with surrounding obstacles to learn based on the errors or collision experiences. However, based on cost and safety considerations, a real collision may not occur to the autonomous vehicle during a real vehicle training.

According to some embodiments, the first sample input information may include an intervention identifier, the intervention identifier can represent whether the first true autonomous driving strategy information is autonomous driving strategy information with human intervention. When the autonomous driving model further includes an evaluation feedback layer, the first training process may further include: inputting the first sample implicit representation into the evaluation feedback layer to obtain the sample evaluation feedback information for the first prediction autonomous driving strategy information output by the evaluation feedback layer. And the above step S950, which adjusting the one or more parameters of the multimodal encoding layer and the decision control layer based on at least the first prediction autonomous driving strategy information and the first real autonomous driving strategy information, may include: adjusting the one or more parameters of the multimodal encoding layer and the decision control layer based on the sample evaluation feedback information ($r_1$, . . . , $r_t$), the intervention identifier ($i_1$, . . . , $i_T$), the first prediction autonomous driving strategy information ($y_1$, . . . , $y_t$) and the first real autonomous driving strategy information $$\left(y_1^{ref}, \ldots, y_t^{ref}\right).$$

During real vehicle training, a safety officer can intervene at any time during a crisis to seize control of the autonomous driving vehicle. After the crisis has passed, the control is then returned to the autonomous driving vehicle. The intervention identifier is used to represent whether the first real autonomous driving strategy information is autonomous driving strategy information with human intervention. In other words, by introducing the intervention identifier, the unacceptable model training costs associated with possible collisions during real vehicle training can be avoided. The reinforcement learning can gradually learn to avoid the unfavorable situations that interventions may occur. By this mechanism, on one hand, the efficiency of the reinforcement learning can be improved, and on the other hand, the influence of disadvantageous experience on the learning process can also be reduced, thereby further improving the robustness of the model obtained by training.

In some embodiments, the parameters of the multimodal encoding layer and the decision control layer may be adjusted using a feedback reinforcement learning approach and a human-in-the-loop learning approach. For example, the learning may be performed based on a quintuple data including the sample evaluation feedback information ($r_1$, . . . , $r_t$), the intervention identifier ($i_1$, . . . , $i_t$), the first prediction autonomous driving strategy information ($y_1$, . . . , $y_t$), the first real autonomous driving strategy information $$\left(y_1^{ref}, \ldots, y_t^{ref}\right),$$

and the first sample input information ($x_1$, . . . , $x_t$).

Wherein, when the intervention identifier $(i_1, \ldots, i_T)$ is a true value, it indicates that the autonomous vehicle is manually operated instead of being controlled by control signals sent by the autonomous driving model; and when the intervention identifier $(i_1, \ldots, i_t)$ is a non-true value, it indicates that the autonomous vehicle is controlled by control signals sent by the autonomous driving model rather than being operated manually $$(y_t^{ref}).$$

In some embodiments, the parameters of the multimodal encoding layer and the evaluation feedback layer may be adjusted using the objective function in equation (8) as follows:

$$L_{HRL} = \lambda_1 \sum_t i_t * (y_t - y_t^{ref})^2 + \lambda_2 \sum_t A_t(1 - i_t)(y_t - y_t^{ref})^2 \quad \text{Equation (8)}$$

where $\lambda_1$ 和 $\lambda_2$ may be hyperparameters indicating weights of the corresponding components, respectively. Where the intervention identifier $(i_1, \ldots, i_T)$ may be a true value of 1 and a non-true value of 0.

In some embodiments, in an offline pre-training phase, the autonomous driving model may be adjusted in conjunction with a plurality of objective functions described above. For example, In some embodiments, the autonomous driving model may be adjusted in an offline pre-training phase using multiple objective functions of Equation (1), Equation (2), or (3), Equation (4), and Equation (5), and accordingly, its objective function may be L1 in Equation (9) as follows:

$$L_1 = L_{SL} + L_{BC} + L_{SSL} + L_{RL} \quad \text{Equation (9)}$$

In some embodiments, in a real vehicle training phase, the autonomous driving model may be adjusted in conjunction with the multiple objective functions described above. For example, In some embodiments, the autonomous driving model may be adjusted in a real vehicle training phase using equation (2) or (3), equation (5), and multiple objective functions in equation (8), and accordingly, its objective function may be L2 in equation (10) as follows:

$$L_2 = L_{SSL} + L_{RL} + L_{HRL} \quad \text{Equation (10)}$$

Figure 14:
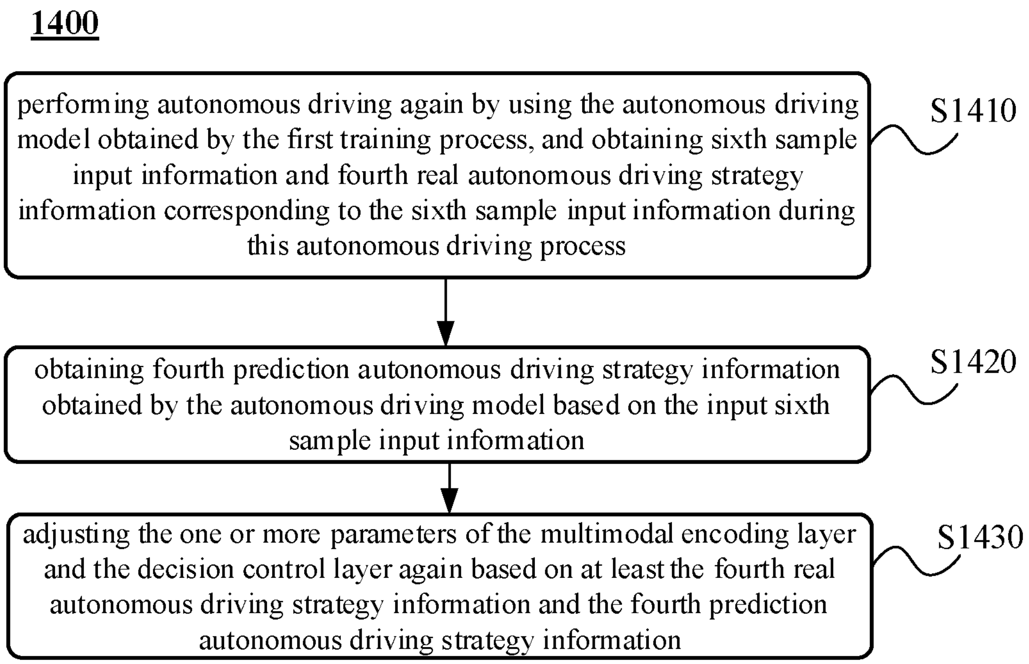
FIG. 14 illustrates a flowchart of a training method for an autonomous driving model, in accordance with other embodiments of the present disclosure.

FIG. 14 illustrates a flowchart of a training method for the autonomous driving model according to other embodiments of the present disclosure.

According to some embodiments, the training method for the autonomous driving model may further include a second training process 1400 for training the multimodal encoding layer and the decision control layer, as shown in FIG. 14, the second training process 1400 may include:

Step S1410, performing autonomous driving again by using the autonomous driving model obtained by the first training process, and obtaining sixth sample input information and fourth real autonomous driving strategy information corresponding to the sixth sample input information during the autonomous driving process;

Step S1420, obtaining fourth prediction autonomous driving strategy information obtained by the autonomous driving model based on the input sixth sample input information; and Step S1430, adjusting the one or more parameters of the multimodal encoding layer and the decision control layer again based on at least the fourth real autonomous driving strategy information and the fourth prediction autonomous driving strategy information.

The sixth sample input information $(x_t)$ may be similar to the first sample input information above; the fourth real autonomous driving strategy information $$(y_1^{ref}, \ldots, y_t^{ref})$$

can be trajectory data of manual driving, and accordingly, the fourth prediction autonomous driving strategy information $(y_t)$ is the prediction result (the trajectory planning) output by the decision control layer, therefore, details are not described again.

Therefore, the autonomous driving model may be continuously iteratively trained in either the real vehicle training process or the emulation training process. In some embodiments, the above-described iterative training may be performed at a preset time interval, thereby continuously optimizing the autonomous driving model.

According to some embodiments, the first sample input information may include the real sample input information of the multimodal encoding layer obtained by performing autonomous driving in a real driving scenario, and/or the emulation sample input information of the multimodal encoding layer obtained by performing an emulated autonomous driving in an emulated driving scenario.

In some embodiments, the first sample input information may include both the real sample input information and the emulation sample input information described above, for example, various settings may be performed on the emulation sample input information with the real sample input information being used as a main part and the emulation sample input information being used as an auxillary part, so that the emulated environment can be utilized to mine more diverse long-tail samples and to expand the richness of the training samples. In other words, the amount of real sample input information used in the training process of the autonomous driving model is larger than that of emulation sample input information.

It will be understood that both the offline pre-training phase and the real vehicle training phase may include training performed in an emulated environment.

According to some embodiments, the real sample input information and/or the emulation sample input information may include an intervention identifier. The intervention identifier can represent whether the corresponding real autonomous driving strategy information is autonomous driving strategy information with human intervention. Therefore, by introducing a human intervention scenario into the emulated training scenario, the emulated scenario becomes more closely aligned with the real driving scenario, thereby further improving the model training effect in the emulated scenario.

According to some embodiments, the real driving scenario may include an intervention real driving scenario with human intervention, and the process of constructing the emulated driving scenario may include: adding the intervention real driving scenario to the emulated driving scenario.

By setting a safety officer for the target vehicle driving based on the autonomous driving model during the emulation process, human intervention can be allowed in the emulation process, so that the autonomous driving model can be trained by using the human-in-the-loop reinforcement learning approach during the emulation process.

According to some embodiments, the process of constructing the emulated driving scenario may include: determining the trajectory of at least one obstacle object in the emulated driving scenario based on the environmental information in the emulated driving scenario. Wherein the environmental information may include the driving information of performing the emulated autonomous driving in the emulated driving scenario based on the autonomous driving model. Wherein the obstacle objects in the emulated driving scenario may include types such as pedestrians, non-motor vehicles, motor vehicles, and the like. The prediction network may be trained for each type of obstacle object in the emulated driving scenario to predict the trajectory of the obstacle object based on the surrounding environmental information of the obstacle object. Thus, a real scenario can be emulated more truly in an emulated driving scenario, thereby improving the effectiveness of training the autonomous driving model in the emulated environment. In some examples, the prediction network may be implemented using a transformer model.

According to some embodiments, determining the trajectory of at least one obstacle object in the emulated driving scenario based on the environmental information in the emulated driving scenario may comprise: determining the emulation perception information of the surrounding environment of the obstacle object based on the environmental information; determining the behavior pattern category of the obstacle object; and predicting the trajectory of the obstacle object based on the emulation perception information and the behavior pattern category.

The behavior pattern category of the obstacle object may be randomly selected from a plurality of predefined behavior pattern categories. In some implementations, the behavior pattern category may be a category that is manually labeled, such as more reckless, more conservative, etc. In other implementations, the behavior pattern category may be a clustering result obtained by using label-free training. A more diverse scenario emulation can be achieved in an emulated driving scenario by randomly determining the category of the behavior pattern of individual obstacle object in the emulated driving scenario.

The emulation perception information includes current perception information and historical perception information of the obstacle object for the surrounding environment during its movement in the emulated environment. The emulation perception information may be structured information and may also be the implicit representation of the structured information (e.g., in BEV space).

Where the environment information includes driving information of performing emulated autonomous driving in the emulated driving scenario based on the autonomous driving model, perception is performed through the environment and the trajectory of the obstacle object is predicted based on the perception information, so that the obstacle object in the emulated environment makes a corresponding reaction in responds to the driving decision of the autonomous driving model, so that the decision-making game between the trained autonomous driving model and other obstacle objects in the emulated environment can be realized in the emulated environment, the authenticity of the emulated scenario can be improved, and thereby improving the training effect of the autonomous driving model.

The autonomous driving model provided in the embodiments of the present disclosure has the following advantages:

High generalization. Compared with the serial-based approach in the related art, a structured representation form of an intermediate state must be defined. For example, the category of the obstacle, the category of the road surface element, and the like. However, if there is a new obstacle or road surface element that is not within the defined format, these method approaches are likely to fail. (Most will become "Unknown Type"). In the end-to-end autonomous driving model in the embodiments of the present disclosure, such problems can be automatically solved to a certain extent by iteration of end-to-end gradient. That is, even though we cannot fully define these categories, the model can derive the characteristics of such new obstacle or road surface element as long as it is trained by such data. That is, the model may learn under the condition that the perception manual annotation is completely absent. Even when the environment changes dramatically, the model can gradually adapt to the relevant changes by continuously updating itself through closed-loop learning of human-in-the-loop and feedback.

High Robustness. Manually defined rules make it difficult to guarantee that the model can still be controlled well when an accident occurs. For example, in the case of sensor failure, brake braking failure, flat tires, etc., and in the case of finding a mismatch between the map and the real observation, it can be unsure which side to trust. In the solution in the embodiments of the present disclosure, such situations may be fully learned into the model parameters. Meanwhile, the perception information and the lane-level map information are imported, and the model can autonomously determine which information needs to be relied on. The model may learn how to process situations, for example, such as temporary traffic lights and temporary constructions are encountered on a road surface, etc.

Certain interpretability and credibility. According to the solution in the embodiments of the present disclosure, in addition to driving behaviors, the model outputs a series of intermediate results (including the structured information, the future prediction, the evaluation feedback, etc.), which solves the problem of interpretability and credibility to a large extent, and realizes "knowing whether one knows", thereby greatly enhancing the interpretability and credibility of the model for human beings.

A complete and feasible phase execution plan. According to the solution in the embodiments of the present disclosure, the perception annotation and the L4 data can be fully utilized for learning. Even without a real vehicle at the initial stage of startup, a higher level can be achieved. At the same time, the double closed loop of real vehicle and emulation is used. The emulated environment is used to quickly mine scenarios that would have been hard to encounter in a real vehicle and perform high-efficiency learning, thereby greatly reducing the demand of real vehicle scenario accumulation.

According to another aspect of the present disclosure, there is provided an autonomous driving device based on the autonomous driving model. The autonomous driving model includes a multimodal encoding layer and a decision control layer, and the multimodal encoding layer and the decision control layer are connected to form an end-to-end neural network model, such that the decision control layer obtains autonomous driving strategy information based directly on the output of the multimodal encoding layer.

Figure 15:
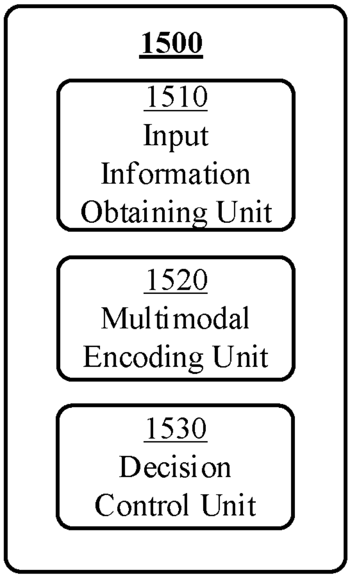
FIG. 15 illustrates a structural block diagram of an autonomous driving device based on an autonomous driving model, in accordance with other embodiments of the present disclosure.

FIG. 15 illustrates a structural block diagram of an autonomous driving device 1500 based on the autonomous driving model according to embodiments of the present disclosure. As shown in FIG. 15, the device 1500 includes:

a input information obtaining unit 1510, configured to obtain first input information of the multimodal encoding layer, where the first input information includes navigation information of the target vehicle and perception information of the surrounding environment of the target vehicle obtained by using sensors, where the perception information includes current perception information and historical perception information for the surrounding environment of the target vehicle in the vehicle driving process;

a multimodal encoding unit 1520, configured to input the first input information into the multimodal encoding layer to obtain an implicit representation corresponding to the first input information output by the multimodal encoding layer; and a decision control unit 1530, configured to input second input information including the implicit representation into the decision control layer to obtain target autonomous driving strategy information output by the decision control layer.

According to another aspect of the present disclosure, there is provided a training device for the autonomous driving model. The autonomous driving model includes a multimodal encoding layer and a decision control layer, and the multimodal encoding layer and the decision control layer are connected to form an end-to-end neural network model such that the decision control layer obtains autonomous driving strategy information based directly on the output of the multimodal encoding layer. The training device for the autonomous driving model is used to train the multimodal encoding layer and the decision control layer.

Figure 16:
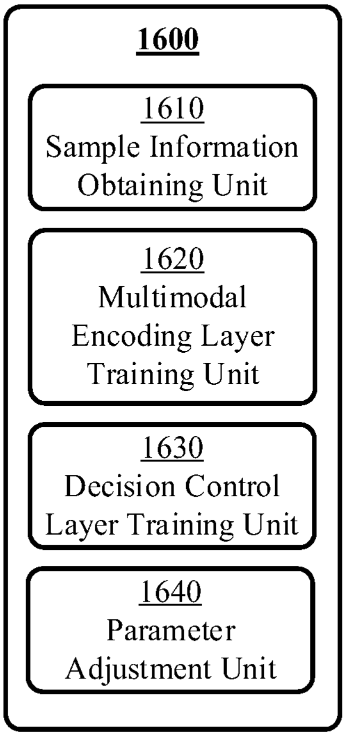
FIG. 16 illustrates a structural block diagram of a training device for an autonomous driving model, in accordance with other embodiments of the present disclosure.

FIG. 16 illustrates a structural block diagram of a training device 1600 for the autonomous driving model according to embodiments of the present disclosure. As shown in FIG. 16, the device 1600 includes:

a sample information obtaining unit 1610, configured to obtain first sample input information and first real autonomous driving strategy information corresponding to the first sample input information, where the first sample input information includes first sample navigational information of first sample vehicle and sample perception information for the surrounding environment of the first sample vehicle, where the sample perception information includes current sample perception information and historical sample perception information for the surrounding environment of the first sample vehicle;

a multimodal encoding layer training unit 1620, configured to input the first sample input information into the multimodal encoding layer to obtain a first sample implicit representation output by the multimodal encoding layer;

a decision control layer training unit 1630, configured to input intermediate sample input information including the first sample implicit representation into the decision control layer to obtain first prediction autonomous driving strategy information output by the decision control layer; and a parameter adjustment unit 1640, configured to adjust one or more parameters of the multimodal encoding layer and the decision control layer based at least on the first prediction autonomous driving strategy information and the first real autonomous driving strategy information.

It should be understood that the various modules or units of the device 1500 shown in FIG. 15 may correspond to the various steps in the method 300 described with reference to FIG. 3. Thus, the operations, features, and advantages described above with respect to the method 300 are equally applicable to the device 1500 and the modules and units included therein; and the various modules or units of the device 1600 shown in FIG. 16 may correspond to the various steps in the method 800 described with reference to FIG. 8. Thus, the operations, features, and advantages described above with respect to method 800 are equally applicable to the device 1600 and the modules and units included therein. For the sake of brevity, certain operations, features, and advantages are not described herein again.

Although specific functions have been discussed above with reference to particular modules, it should be noted that the functions of the various units discussed herein may be divided into multiple units, and/or at least some functions of the multiple units may be combined into a single unit.

It should also be understood that various techniques may be described herein in the general context of software hardware elements or program modules. The various units described above with respect to FIGS. 15 and 16 may be implemented in hardware or in hardware incorporating software and/or firmware. For example, these units may be implemented as computer program code/instructions that are configured to be executed in one or more processors and stored in a computer-readable storage medium. Alternatively, these units may be implemented as hardware logic/circuits. For example, in some embodiments, the units 1510-1530, and one or more of the units 1610-1640 may be implemented together in a System on Chip (SoC). The SoC may include an integrated circuit chip (which includes a processor (e.g., a Central Processing Unit (CPU), a microcontroller, a microprocessor, a Digital Signal Processor (DSP), etc.), a memory, one or more communication interfaces, and/or one or more components of other circuits), and may optionally execute the received program code and/or include an embedded firmware to perform a function.

According to another aspect of the present disclosure, there is further provided an electronic device, comprising: at least one processor; and a memory communicatively connected to the at least one processor; the memory stores instructions executable by the at least one processor, and the instructions are executed by the at least one processor, so that the at least one processor can perform an autonomous driving method or a training method for an autonomous driving model according to some embodiments of the present disclosure.

According to another aspect of the present disclosure, there is further provided a non-transitory computer-readable storage medium storing computer instructions, wherein the computer instructions are used for causing the computer to execute an autonomous driving method or a training method for an autonomous driving model according to some embodiments of the present disclosure.

According to another aspect of the present disclosure, there is further provided a computer program product, comprising a computer program, wherein when the computer program is executed by a processor, an autonomous driving method or a training method for an autonomous driving model according to some embodiments of the present disclosure is implemented.

According to another aspect of the present disclosure, there is also provided an autonomous driving vehicle, comprising an autonomous driving device 1500, a training device 1600 for the autonomous driving model, and one of the above electronic devices according to some embodiments of the present disclosure.

Figure 17:
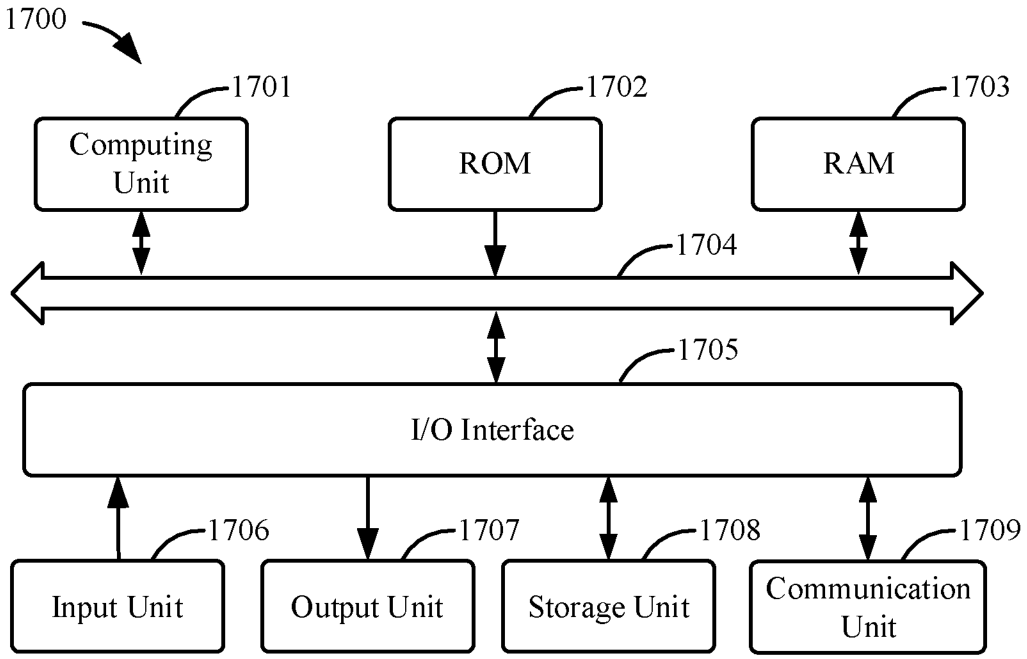
FIG. 17 illustrates a structural block diagram of an example electronic device that can be used to implement embodiments of the present disclosure.

Referring to FIG. 17, a structural block diagram of an electronic device 1700 that may be a server or client of the present disclosure is now described, which is an example of a hardware device that may be applied to aspects of the present disclosure. Electronic devices are intended to represent various forms of digital electronic computer devices, such as laptop computers, desktop computers, workstations, personal digital assistants, servers, blade servers, mainframe computers, and other suitable computers. The electronic devices may also represent various forms of mobile devices, such as personal digital processing, cellular telephones, smart phones, wearable devices, and other similar computing devices. The components shown herein, their connections and relationships, and their functions are merely as examples, and are not intended to limit the implementations of the disclosure described and/or claimed herein.

As shown in FIG. 17, the electronic device 1700 includes a computing unit 1701, which may perform various appropriate actions and processing according to a computer program stored in a read-only memory (ROM) 1702 or a computer program loaded into a random access memory (RAM) 1703 from a storage unit 1708. In the RAM 1703, various programs and data required by the operation of the electronic device 1700 may also be stored. The computing unit 1701, the ROM 1702, and the RAM 1703 are connected to each other through a bus 1704. Input/output (I/O) interface 1705 is also connected to the bus 1704.

A plurality of components in the electronic device 1700 are connected to a I/O interface 1705, including: an input unit 1706, an output unit 1707, a storage unit 1708, and a communication unit 1709. The input unit 1706 may be any type of device capable of inputting information to the electronic device 1700, the input unit 1706 may receive input digital or character information and generate a key signal input related to user setting and/or function control of the electronic device, and may include, but is not limited to, a mouse, a keyboard, a touch screen, a track pad, a trackball, a joystick, a microphone, and/or a remote control. The output unit 1707 may be any type of device capable of presenting information, and may include, but are not limited to, a display, a speaker, a video/audio output terminal, a vibrator, and/or a printer. The storage unit 1708 may include, but is not limited to, a magnetic disk and an optical disk. The communication unit 1709 allows the electronic device 1700 to exchange information/data with other devices over a computer network, such as the Internet, and/or various telecommunication networks, and may include, but is not limited to, a modem, a network card, an infrared communication device, a wireless communication transceiver and/or a chipset, such as a Bluetooth device, a 802.11 device, a WiFi device, a WiMAX device, a cellular communication device, and/or the like.

The computing unit 1701 may be a variety of general and/or special purpose processing components with processing and computing capabilities. Some examples of the computing unit 1701 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The computing unit 1701 performs the various methods and processes described above, such as methods (or processes) 300-1400. For example, in some embodiments, methods (or processes) 300-1400 may be implemented as a computer software program tangibly contained in a machine-readable medium, such as the storage unit 1708. In some embodiments, part or all of the computer program may be loaded and/or installed onto the electronic device 1700 via the ROM 1702 and/or the communication unit 1709. When the computer program is loaded to the RAM 1703 and executed by the computing unit 1701, one or more steps of the methods (or processes) 300-1400 described above may be performed. Alternatively, in other embodiments, the computing unit 1701 may be configured to perform the method (or process) 300-1400 by any other suitable means (e.g., with the aid of firmware).

Various embodiments of the systems and techniques described above herein may be implemented in a digital electronic circuit system, an integrated circuit system, a field programmable gate array (FPGA), an application specific integrated circuit (ASIC), a dedicated standard product (ASSP), a system of system on a chip system (SoC), a complex programmable logic device (CPLD), computer hardware, firmware, software, and/or combinations thereof. These various embodiments may include: implementation in one or more computer programs that may be executed and/or interpreted on a programmable system including at least one programmable processor, where the programmable processor may be a dedicated or universal programmable processor that may receive data and instructions from a storage system, at least one input device, and at least one output device, and transmit data and instructions to the storage system, the at least one input device, and the at least one output device.

The program code for implementing the method of the present disclosure may be written in any combination of one or more programming languages. These program code may be provided to a processor or controller of a general purpose computer, a special purpose computer, or other programmable data processing device such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium, which may contain or store a program for use by or in connection with an instruction execution system, device, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of a machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with a user, the systems and techniques described herein may be implemented on a computer having: a display device (e.g., a CRT (cathode ray tube) or an LCD (liquid crystal display) monitor) for displaying information to a user; and a keyboard and pointing device (e.g., a mouse or trackball) by which a user may provide input to the computer. Other types of devices may also be used to provide interaction with a user; for example, the feedback provided to the user may be any form of perception feedback (e.g., visual feedback, auditory feedback, or tactile feedback); and the input from the user may be received in any form, including acoustic input, voice input, or haptic input.

The systems and techniques described herein may be implemented in a computing system including a back-end component (e.g., as a data server), or a computing system including a middleware component (e.g., an application server), or a computing system including a front-end component (e.g., a user computer with a graphical user interface or a web browser, the user may interact with implementations of the systems and techniques described herein through the graphical user interface or the web browser), or in a computing system including any combination of such back-end components, middleware components, or front-end components. The components of the system may be interconnected by digital data communication (e.g., a communications network) in any form or medium. Examples of communication networks include a local area network (LAN), a wide area network (WAN), the Internet, and a blockchain network.

The computer system may include a client and a server. Clients and servers are generally remote from each other and typically interact through a communication network. The relationship between clients and servers is generated by computer programs running on respective computers and having a client-server relationship to each other. The server may be a cloud server, or may be a server of a distributed system, or a server incorporating a blockchain.

It should be understood that the various forms of processes shown above may be used, and the steps may be reordered, added, or deleted. For example, the steps described in the present disclosure may be performed in parallel or sequentially or in a different order, as long as the results expected by the technical solutions disclosed in the present disclosure can be achieved, and no limitation is made herein.

Although embodiments or examples of the present disclosure have been described with reference to the accompanying drawings, it should be understood that the foregoing methods, systems, and devices are merely embodiments or examples, and the scope of the present disclosure is not limited by these embodiments or examples, but is only defined by the authorized claims and their equivalents. Various elements in the embodiments or examples may be omitted or may be replaced by equivalent elements thereof. Further, the steps may be performed by a different order than described in this disclosure. Further, various elements in the embodiments or examples may be combined in various ways. Importantly, with the evolution of the technology, many elements described herein may be replaced by equivalent elements appearing after the present disclosure.

The invention claimed is:

1. An autonomous driving method implemented by using an automatic driving model, wherein the autonomous driving model comprises a multimodal encoding layer and a decision control layer, the multimodal encoding layer and the decision control layer are connected to form an end-to-end neural network model such that the decision control layer obtains autonomous driving strategy information based directly on the output of the multimodal encoding layer, wherein the autonomous driving model further comprises a future prediction layer and wherein the method comprises:

obtaining first input information of the multimodal encoding layer, wherein the first input information comprises navigation information of a target vehicle and perception information for surrounding environment of the target vehicle obtained by using one or more sensors, and the perception information comprises current perception information and historical perception information for the surrounding environment of the target vehicle during vehicle driving process;

inputting the first input information into the multimodal encoding layer to obtain an implicit representation corresponding to the first input information output by the multimodal encoding layer;

inputting the implicit representation into the future prediction layer to obtain future prediction information for the surrounding environment of the target vehicle output by the future prediction laver; and inputting second input information including the implicit representation into the decision control layer to obtain target autonomous driving strategy information output by the decision control layer comprising:

inputting the second input information including the implicit representation and at least a portion of the future prediction information into the decision control layer to obtain the target autonomous driving strategy information output by the decision control layer, wherein the target autonomous driving strategy information includes a planning trajectory for the target vehicle or a control signal for the target vehicle.

2. The method of claim 1, wherein the autonomous driving model further comprises a perception detection layer, and wherein the method further comprises:

inputting the implicit representation into the perception detection layer to obtain target detection information for the surrounding environment of the target vehicle output by the perception detection layer, wherein the target detection information comprises current detection information and historical detection information, the current detection information comprises types and current state information of a plurality of obstacles and road surface elements in the surrounding environment of the target vehicle, and the historical detection information comprises types and historical state information of a plurality of obstacles in the surrounding environment of the target vehicle, wherein the inputting the second input information including the implicit representation into the decision control layer to obtain the target autonomous driving strategy information output by the decision control layer comprises:

inputting the second input information including at least a portion of the target detection information and the implicit representation into the decision control layer to obtain the target autonomous driving strategy information output by the decision control layer.

3. The method of claim 2, wherein the autonomous driving model further comprises an evaluation feedback layer, and wherein the method further comprises:

inputting the implicit representation into the evaluation feedback layer to obtain evaluative feedback information for the target autonomous driving strategy information output by the evaluation feedback layer.

4. The method of claim 3, wherein the inputting the implicit representation into the evaluation feedback layer to obtain the evaluative feedback information for the target autonomous driving strategy information output by the evaluation feedback layer comprises:

inputting at least a portion of one or both of the future prediction information and the target detection information, and the implicit representation into the evaluation feedback layer to obtain the evaluative feedback information for the target autonomous driving strategy information output by the evaluation feedback layer.

5. The method of claim 3, wherein the inputting the implicit representation into the evaluation feedback layer to obtain the evaluative feedback information for the target autonomous driving strategy information output by the evaluation feedback layer comprises:

inputting the implicit representation and the target autonomous driving strategy information into the evaluation feedback layer to obtain the evaluative feedback information for the target autonomous driving strategy information output by the evaluation feedback layer.

6. The method of claim 3, wherein the autonomous driving model further comprises an interpretation layer, and wherein the method further comprises:

inputting the implicit representation into the interpretation layer to obtain interpretation information for the target autonomous driving strategy information output by the interpretation layer, wherein the interpretation information can represent a decision category of the target autonomous driving strategy information.

7. The method of claim 6, wherein the inputting the implicit representation into the interpretation layer to obtain the interpretation information for the target autonomous driving strategy information output by the interpretation layer comprises:

inputting at least a portion of one or both of future prediction information and target detection information, and the implicit representation into the interpretation layer to obtain the interpretation information for the target autonomous driving strategy information output by the interpretation layer.

8. The method of claim 6, wherein the inputting the implicit representation into the interpretation layer to obtain the interpretation information for the target autonomous driving strategy information output by the interpretation layer comprises:

inputting the implicit representation and the target autonomous driving strategy information into the interpretation layer to obtain the interpretation information for the target autonomous driving strategy information output by the interpretation layer.

9. The method of claim 1, wherein the multimodal encoding layer and the decision control layer of the automatic driving model are obtained by performing a first training process for training on an initial multimodal encoding layer and an initial decision control layer, and wherein the first training process comprises:

obtaining first sample input information and first real autonomous driving strategy information corresponding to the first sample input information, wherein the first sample input information comprises first sample navigation information of a first sample vehicle and sample perception information for surrounding environment of the first sample vehicle, and the sample perception information comprises current sample perception information and historical sample perception information for the surrounding environment of the first sample vehicle;

inputting the first sample input information into the initial multimodal encoding layer to obtain a first sample implicit representation output by the initial multimodal encoding layer;

inputting intermediate sample input information including the first sample implicit representation into the initial decision control layer to obtain first prediction autonomous driving strategy information output by the initial decision control layer; and adjusting one or more parameters of the initial multimodal encoding layer and the initial decision control layer based on at least the first prediction autonomous driving strategy information and the first real autonomous driving strategy information.

10. The method of claim 9, further comprising:

before the first training process, performing an offline pre-training on the initial multimodal encoding layer and the initial decision control layer such that the autonomous driving model can obtain the first prediction autonomous driving strategy information based on the first sample input information;

wherein the first training process further comprises:

performing a first autonomous driving using the autonomous driving model obtained by the offline pre-training; and obtaining the first sample input information and the first real autonomous driving strategy information corresponding to the first sample input information during the first autonomous driving.

11. The method of claim 10, wherein the autonomous driving model further comprises a perception detection layer and a future prediction layer, and performing the offline pre-training on the initial multimodal encoding layer comprises:

obtaining second sample input information as well as first real detection information and first future real information for surrounding environment of a second sample vehicle corresponding to the second sample input information, wherein the second sample input information comprises second sample navigation information of the second sample vehicle and sample perception information for the surrounding environment of the second sample vehicle, the first real detection information comprises types, real current state information and real history state information of a plurality of real sample obstacles in the surrounding environment of the second sample vehicle, and types and real current state information of a plurality of real sample road surface elements, and the first future real information comprises real detection information at a future moment;

inputting the second sample input information into the initial multimodal encoding layer to obtain a second sample implicit representation corresponding to the second sample input information output by the initial multimodal encoding layer;

inputting the second sample implicit representation into the perception detection layer to obtain first prediction detection information output by the perception detection layer, wherein the first prediction detection information comprises types, prediction current state information and prediction history state information of a plurality of prediction sample obstacles, and types and prediction current state information of a plurality of prediction sample road surface elements in the surrounding environment of the second sample vehicle;

inputting the second sample implicit representation into the future prediction layer to obtain first future prediction information output by the future prediction layer;

adjusting one or more parameters of the initial multimodal encoding layer based on the first real detection information and the first prediction detection information, as well as the first future real information and the first future prediction information;

adjusting one or more parameters of the perception detection layer based on the first real detection information and the first prediction detection information; and adjusting one or more parameters of the future prediction layer based on the first future real information and the first future prediction information.

12. The method of claim 10, wherein the autonomous driving model further comprises a future prediction layer, and performing the offline pre-training on the initial multimodal encoding layer and the initial decision control layer comprises:

obtaining third sample input information as well as second future real information and second real autonomous driving strategy information for surrounding environment of a third sample vehicle corresponding to the third sample input information, wherein the third sample input information comprises third sample navigation information of the third sample vehicle and sample perception information for the surrounding environment of the third sample vehicle;

inputting the third sample input information into the initial multimodal encoding layer to obtain a third sample implicit representation corresponding to the third sample input information output by the initial multimodal encoding layer;

inputting the third sample implicit representation into the future prediction layer to obtain second future prediction information output by the future prediction layer;

inputting a sample intermediate representation including the third sample implicit representation into the initial decision control layer to obtain second prediction autonomous driving strategy information output by the initial decision control layer;

adjusting one or more parameters of the future prediction layer based on the second future real information and the second future prediction information;

adjusting one or more parameters of the initial multimodal encoding layer based on the second real autonomous driving strategy information and the second prediction autonomous driving strategy information, as well as the second future real information and the second future prediction information; and adjusting one or more parameters of the initial decision control layer based on the second real autonomous driving strategy information and the second prediction autonomous driving strategy information.

13. The method of claim 12, wherein the performing the offline pre-training on the initial multimodal encoding layer and the initial decision control layer comprises:

inputting the third sample input information into a driving strategy prediction model to obtain second autonomous driving strategy real information output by the driving strategy prediction model.

14. The method of claim 10, wherein the autonomous driving model further comprises an evaluation feedback layer, and performing the offline pre-training on the initial multimodal encoding layer and the initial decision control layer further comprises:

obtaining fourth sample input information and third real autonomous driving strategy information corresponding to the fourth sample input information, wherein the fourth sample input information comprises fourth sample navigation information of the fourth sample vehicle and sample perception information for the surrounding environment of the fourth sample vehicle;

inputting the fourth sample input information into the initial multimodal encoding layer to obtain a fourth sample implicit representation corresponding to the fourth sample input information output by the initial multimodal encoding layer;

inputting intermediate sample input information including the fourth sample implicit representation into the initial decision control layer to obtain third prediction autonomous driving strategy information output by the initial decision control layer;

inputting the fourth sample implicit representation into the evaluation feedback layer to obtain sample evaluation feedback information for the third prediction autonomous driving strategy information output by the evaluation feedback layer;

adjusting one or more parameters of the initial multimodal encoding layer and the initial decision control layer based on the sample evaluation feedback information for the third prediction autonomous driving strategy information, the third prediction autonomous driving strategy information and the third real autonomous driving strategy information.

15. The method of claim 14, wherein the training process of the evaluation feedback layer comprises:

obtaining fifth sample input information and real evaluation feedback information for the fifth sample input information, wherein the fifth sample input information comprises fifth sample navigation information of the fifth sample vehicle and sample perception information for the surrounding environment of the fifth sample vehicle;

inputting the fifth sample input information into the initial multimodal encoding layer to obtain a fifth sample implicit representation corresponding to the fifth sample input information output by the initial multimodal encoding layer;

inputting the fifth sample implicit representation into the evaluation feedback layer to obtain prediction evaluation feedback information for the fifth sample input information output by the evaluation feedback layer; and adjusting one or more parameters of the initial multimodal encoding layer and the evaluation feedback layer based on the real evaluation feedback information and the prediction evaluation feedback information.

16. The method of claim 14, wherein the first sample input information comprises an intervention identifier, the intervention identifier can represent whether the first real autonomous driving strategy information is autonomous driving strategy information with human intervention, and the first training process further comprises:

inputting the first sample implicit representation into the evaluation feedback layer to obtain sample evaluation feedback information for the first prediction autonomous driving strategy information output by the evaluation feedback layer, and wherein the adjusting one or more parameters of the initial multimodal encoding layer and the initial decision control layer based on at least the first prediction autonomous driving strategy information and the first real autonomous driving strategy information comprises:

adjusting one or more parameters of the initial multimodal encoding layer and the initial decision control layer based on the sample evaluation feedback information, the intervention identifier, the first prediction autonomous driving strategy information and the first real autonomous driving strategy information.

17. The method of claim 16, wherein the multimodal encoding layer and the decision control layer of the automatic driving model are obtained by further performing a second training process, and wherein the second training process comprises:

performing a second autonomous driving by using the autonomous driving model obtained by the first training process, and obtaining sixth sample input information and fourth real autonomous driving strategy information corresponding to the sixth sample input information during the second autonomous driving, wherein the sixth sample input information comprises sixth sample navigation information of the sixth sample vehicle and sample perception information for the surrounding environment of the sixth sample vehicle;

obtaining fourth prediction autonomous driving strategy information output by the autonomous driving model based on the sixth sample input information; and adjusting the one or more parameters of the initial multimodal encoding layer and the initial decision control layer again based on at least the fourth real autonomous driving strategy information and the fourth prediction autonomous driving strategy information.

18. An electronic device, comprising:

one or more processors; and a memory storing one or more programs configured to be executed by the one or more processors, the one or more programs comprising instructions for performing operations comprising:

obtaining first input information of a multimodal encoding layer of an automatic driving model, wherein the first input information comprises navigation information of a target vehicle and perception information for surrounding environment of the target vehicle obtained by using one or more sensors, and the perception information comprises current perception information and historical perception information for the surrounding environment of the target vehicle during vehicle driving process;

inputting the first input information into the multimodal encoding layer to obtain an implicit representation corresponding to the first input information output by the multimodal encoding layer;

inputting the implicit representation into a future prediction layer of the automatic driving model to obtain future prediction information for the surrounding environment of the target vehicle output by the future prediction laver; and inputting second input information including the implicit representation into a decision control layer of the automatic driving model to obtain target autonomous driving strategy information output by the decision control layer, comprising:

inputting the second input information including the implicit representation and at least a portion of the future prediction information into the decision control layer to obtain the target autonomous driving strategy information output by the decision control laver, wherein the target autonomous driving strategy information includes a planning trajectory for the target vehicle or a control signal for the target vehicle;

wherein the multimodal encoding layer and the decision control layer are connected to form an end-to-end neural network model such that the decision control layer obtains autonomous driving strategy information based directly on the output of the multimodal encoding layer.

19. A non-transitory computer-readable storage medium storing one or more programs comprising instructions that, when executed by one or more processors of a computing device, cause the computing device to perform operations comprising:

obtaining first input information of a multimodal encoding layer of an automatic driving model, wherein the first input information comprises navigation information of a target vehicle and perception information for surrounding environment of the target vehicle obtained by using one or more sensors, and the perception information comprises current perception information and historical perception information for the surrounding environment of the target vehicle during vehicle driving process;

inputting the first input information into the multimodal encoding layer to obtain an implicit representation corresponding to the first input information output by the multimodal encoding layer;

inputting the implicit re Presentation into a future prediction layer of the automatic driving model to obtain future prediction information for the surrounding environment of the target vehicle output by the future prediction laver; and inputting second input information including the implicit representation into a decision control layer of the automatic driving model to obtain target autonomous driving strategy information output by the decision control layer, comprising:

inputting the second input information including the implicit representation and at least a portion of the future prediction information into the decision control layer to obtain the target autonomous driving strategy information output by the decision control layer, wherein the target autonomous driving strategy information includes a planning trajectory for the target vehicle or a control signal for the target vehicle;

wherein the multimodal encoding layer and the decision control layer are connected to form an end-to-end neural network model such that the decision control layer obtains autonomous driving strategy information based directly on the output of the multimodal encoding layer.

* * * * *